US 11,235,550 B2

(12) United States Patent
Okada et al.

(10) Patent No.: US 11,235,550 B2
(45) Date of Patent: Feb. 1, 2022

(54) IN-MOLD FOAMED MOLDING UNIT AND METHOD FOR PRODUCING IN-MOLD FOAMED MOLDING UNIT

(71) Applicants: KANEKA CORPORATION, Osaka (JP); KANEKA FOAM PLASTICS CO., LTD., Tokyo (JP)

(72) Inventors: Yuya Okada, Tochigi (JP); Tsuyoshi Umetani, Tochigi (JP)

(73) Assignees: KANEKA CORPORATION, Osaka (JP); KANEKA FOAM PLASTICS CO., LTD., Tokyo (JP)

( * ) Notice: Subject to any disclaimer, the term of this patent is extended or adjusted under 35 U.S.C. 154(b) by 111 days.

(21) Appl. No.: 16/447,204

(22) Filed: Jun. 20, 2019

(65) Prior Publication Data

US 2019/0299498 A1 Oct. 3, 2019

Related U.S. Application Data

(63) Continuation of application No. PCT/JP2017/044151, filed on Dec. 8, 2017.

(30) Foreign Application Priority Data

Dec. 21, 2016 (JP) .............................. JP2016-248305

(51) Int. Cl.
*B32B 15/02* (2006.01)
*B32B 3/04* (2006.01)
(Continued)

(52) U.S. Cl.
CPC .................. *B32B 3/04* (2013.01); *B32B 5/20* (2013.01); *B32B 7/028* (2019.01); *B32B 15/043* (2013.01);
(Continued)

(58) Field of Classification Search
CPC ............... B32B 15/046; A47C 7/18–20; B29L 2031/58; B29L 2031/771;
(Continued)

(56) References Cited

U.S. PATENT DOCUMENTS 5,013,090 A 5/1991 Matsuura
5,669,129 A * 9/1997 Smith ..................... B29C 63/02
29/418
(Continued)

FOREIGN PATENT DOCUMENTS

CN 1119509 A 4/1996
CN 1128639 A 8/1996
(Continued)

OTHER PUBLICATIONS

Office Action issued in counterpart Chinese Patent Application No. 201780079235.6 dated Dec. 23, 2020 (21 pages).
(Continued)

*Primary Examiner* — Z. Jim Yang
(74) *Attorney, Agent, or Firm* — Osha Bergman Watanabe & Burton LLP

(57) ABSTRACT

An in-mold foamed molded product unit may include an in-mold foamed molded product made of a thermoplastic resin, and an insert material. At least a portion of the insert material may be embedded in the in-mold foamed molded product. The insert material may have a frame-like shape that is substantially rectangular shape and includes a first set of opposite sides and a second set of opposite sides. A portion of the insert material that corresponds to the first set of opposite sides may be a first extending portion, and a portion of the insert material that corresponds to the second set of opposite sides may be a second extending portion. The first extending portion may be substantially entirely embedded in the in-mold foamed molded product, and the second
(Continued)

extending portion may include an exposed portion that is exposed to the outside of the in-mold foamed molded product.

8 Claims, 14 Drawing Sheets

(51) Int. Cl.
| | | |
|---|---|---|
| B60N 2/90 | (2018.01) | |
| C08J 9/228 | (2006.01) | |
| B32B 5/20 | (2006.01) | |
| B32B 7/028 | (2019.01) | |
| B32B 15/04 | (2006.01) | |
| B32B 15/18 | (2006.01) | |
| A47C 7/20 | (2006.01) | |
| A47C 27/14 | (2006.01) | |
| B29K 101/12 | (2006.01) | |
| B29K 105/04 | (2006.01) | |
| B29K 705/00 | (2006.01) | |
| B29L 31/30 | (2006.01) | |
| B29L 31/00 | (2006.01) | |
| B60N 2/64 | (2006.01) | |

(52) U.S. Cl.
CPC ............ *B32B 15/046* (2013.01); *B32B 15/18* (2013.01); *B60N 2/90* (2018.02); *C08J 9/228* (2013.01); *A47C 7/20* (2013.01); *A47C 27/14* (2013.01); *B29K 2101/12* (2013.01); *B29K 2105/04* (2013.01); *B29K 2705/00* (2013.01); *B29L 2031/30* (2013.01); *B29L 2031/771* (2013.01); *B32B 2266/025* (2013.01); *B32B 2605/003* (2013.01); *B60N 2/64* (2013.01); *Y10T 428/232* (2015.01); *Y10T 428/237* (2015.01)

(58) Field of Classification Search
CPC ........... B60N 2/62–995; B60N 2002/684–905; B29C 44/1214; B29C 44/1271; B29C 44/1276; B29C 44/1285
See application file for complete search history.

(56) References Cited

U.S. PATENT DOCUMENTS

| | | | |
|---|---|---|---|
| 2010/0063170 A1 | 3/2010 | Ishida et al. | |
| 2010/0267850 A1 | 10/2010 | Yoshida et al. | |
| 2012/0126606 A1 | 5/2012 | Takakura et al. | |
| 2013/0197112 A1 | 8/2013 | Fukuzawa et al. | |
| 2013/0230713 A1 | 9/2013 | Yoshida et al. | |
| 2013/0231409 A1 | 9/2013 | Fukuzawa et al. | |
| 2017/0136659 A1* | 5/2017 | Tobimatsu | B29C 33/12 |
| 2017/0232877 A1* | 8/2017 | De Nichilo | B60N 2/70 297/452.18 |
| 2017/0252952 A1 | 9/2017 | Takayama et al. | |
| 2017/0334106 A1* | 11/2017 | Sameshima | B29C 44/445 |
| 2018/0368578 A1* | 12/2018 | Takayama | A47C 7/24 |
| 2019/0014907 A1* | 1/2019 | Hisamatsu | A47C 7/16 |
| 2019/0030765 A1* | 1/2019 | Tobimatsu | A47C 27/14 |
| 2019/0099002 A1* | 4/2019 | Murata | A47C 27/16 |
| 2019/0176669 A1* | 6/2019 | Noro | A47C 7/20 |
| 2019/0217759 A1* | 7/2019 | Sakakibara | B60N 2/015 |
| 2020/0000235 A1* | 1/2020 | Hashimoto | B60N 2/7017 |
| 2020/0031260 A1* | 1/2020 | Zalzala | B60N 2/686 |

FOREIGN PATENT DOCUMENTS

| | | | |
|---|---|---|---|
| CN | 1130493 A | 9/1996 | |
| CN | 1165642 A | 11/1997 | |
| CN | 1201381 A | 12/1998 | |
| CN | 1951662 A | 4/2007 | |
| CN | 201617973 U | 11/2010 | |
| CN | 103568196 A | 2/2014 | |
| CN | 203510557 U | 4/2014 | |
| CN | 106170377 A | 11/2016 | |
| EP | 3170640 A1 | 5/2017 | |
| JP | 2003201360 A | 7/2003 | |
| JP | 2006117842 A | 5/2006 | |
| JP | 2008239794 A | 10/2008 | |
| JP | 2011016458 A | 1/2011 | |
| JP | 2011036275 A | 2/2011 | |
| JP | 2014118474 A | 6/2014 | |
| JP | 2015136851 A | 7/2015 | |
| JP | 2016022292 A | 2/2016 | |
| JP | 2016-055622 A | 4/2016 | |
| JP | 2016060064 A | 4/2016 | |
| JP | 2017113053 A | 6/2017 | |
| JP | 2018029756 A | 3/2018 | |
| WO | 2009075208 A1 | 6/2009 | |
| WO | 2015137363 A1 | 9/2015 | |
| WO | 2016009820 A1 | 1/2016 | |
| WO | 2016152243 A1 | 9/2016 | |
| WO | 2016152530 A1 | 9/2016 | |
| WO | WO-2018030484 A1 * | 2/2018 | B29C 39/10 |

OTHER PUBLICATIONS

Extended European Search Report issued in corresponding European Application No. 17884381.9; dated Jul. 15, 2020 (7 pages).
International Search Report issued in corresponding International Application No. PCT/JP2017/044151; dated Jan. 16, 2018 (1 page).
International Preliminary Report on Patentability issued in corresponding International Application No. PCT/JP2017/044151; dated Jul. 4, 2019 (7 pages).
Office Action issued in corresponding Chinese Application No. 201780079235.6 dated Jul. 5, 2021 (7 pages).

* cited by examiner

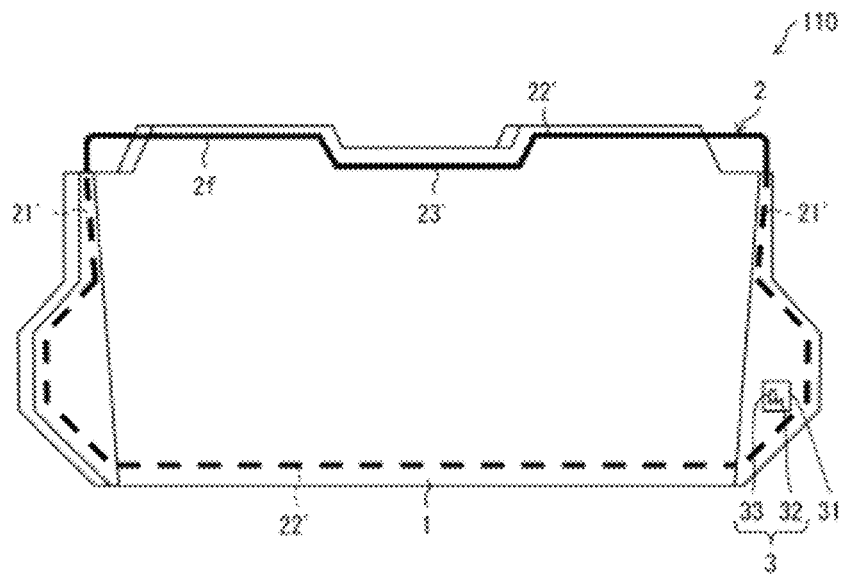
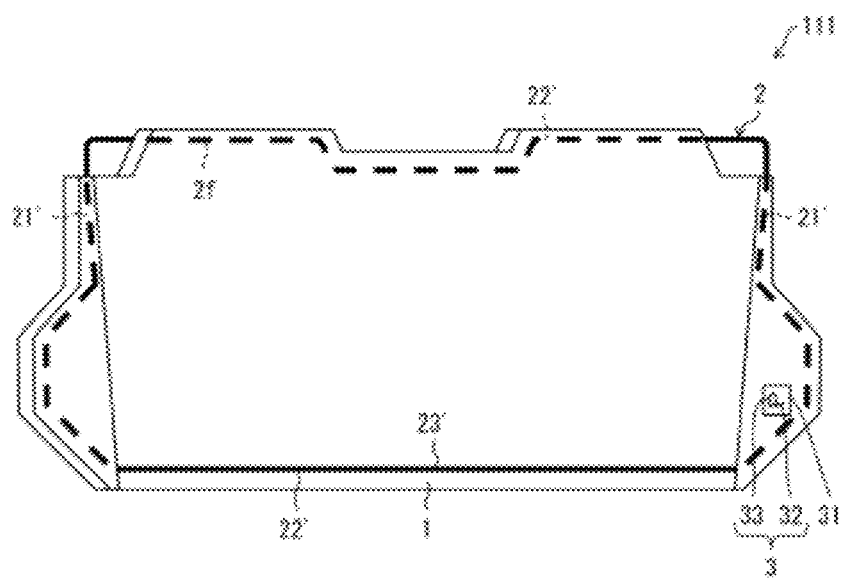

IN-MOLD FOAMED MOLDING UNIT AND METHOD FOR PRODUCING IN-MOLD FOAMED MOLDING UNIT

TECHNICAL FIELD

One or more embodiments of the present invention relate to an in-mold foamed molded product unit and a method for producing the in-mold foamed molded product unit.

BACKGROUND

Conventionally, a vehicle seat has typically been produced by providing a seat body made of polyurethane foam in an integrated manner with a metal wire embedded therein. The metal wire serves as an insert material for stabilizing the shape of the vehicle seat. Recently, in view of achieving vehicle weight reduction, cost reduction, and the like, there has been proposed a configuration in which polyurethane foam is combined with an in-mold foamed molded product unit, which is molded from an olefin-based resin (thermoplastic resin). The in-mold foamed molded product unit is obtained by insert molding in which an insert material (for example, a metal wire) is provided in an in-mold foamed molded product made of olefin-based resin expanded particles. The in-mold foamed molded product unit is used as a core material of the vehicle seat. The vehicle seat is obtained by providing the in-mold foamed molded product unit integrally with the polyurethane foam and then covering the in-mold foamed molded product unit and the polyurethane foam with a seat cover.

In one known configuration of the in-mold foamed molded product unit, a portion of the insert material and/or a retainer embedded in the in-mold foamed molded product unit is/are exposed (Patent Literatures 1 to 4).

PATENT LITERATURE

[Patent Literature 1] Japanese Patent Application Publication, Tokukai, No. 2011-16458
[Patent Literature 2] Japanese Patent Application Publication, Tokukai, No. 2016-22292
[Patent Literature 3] Japanese Patent Application Publication, Tokukai, No. 2016-60064
[Patent Literature 4] PCT International Publication No. WO 2016/152530
[Patent Literature 5] Japanese Patent Application Publication, Tokukai, No. 2017-113053

The above-described in-mold foamed molded product obtained by insert molding once shrinks immediately after molding, and then expands through curing and drying (dimensional recovery). Through such shrinkage and expansion, the shape of the in-mold foamed molded product becomes a desired shape. The inventors of the present application focused on the phenomenon that during the above shrinkage and expansion, since the insert material embedded in the in-mold foamed molded product does not follow the shrinkage and the expansion of the in-mold foamed molded product and stays as it is, an unexpected deformation of the in-mold foamed molded product may disadvantageously occur when the insert material impedes the shrinkage and the expansion of the in-mold foamed molded product. The inventors of the present application have uniquely found that it is difficult to form an in-mold foamed molded product into a desired shape. Further, in line with the above, the fabrication of a mold is difficult because it is difficult to predict dimensional deviation in advance and reflect the dimensional deviation to a shape of the mold which shape is to be transferred to the in-mold foamed molded product from the mold.

Meanwhile, in a case where a portion of the insert material and/or a retainer is/are exposed too much outside the in-mold foamed molded product in the in-mold foamed molded product unit, the strength of the in-mold foamed molded product unit may disadvantageously be insufficient.

In other words, the inventors of one or more embodiments of the present invention uniquely found that there are conflicting objects to be achieved, one of which is to form an in-mold foamed molded product into a desired shape and the other of which is to ensure a sufficient strength of the in-mold foamed molded product.

Techniques disclosed in Patent Literatures 1 to 4 are not sufficient for addressing the above.

SUMMARY

One or more embodiments of the present invention provide an in-mold foamed molded product unit which not only makes it easy to form an in-mold foamed molded product into a desired shape but also has a sufficient strength, and a method for producing the in-mold foamed molded product unit.

An in-mold foamed molded product unit in accordance with one or more embodiments of the present invention includes: an in-mold foamed molded product made of a thermoplastic resin; and an insert material embedded in the in-mold foamed molded product, the insert material being formed into a frame-like shape which is a substantially rectangular shape, the insert material including a first extending portion corresponding to one of two sets of opposite sides of the substantially rectangular shape, and a second extending portion corresponding to another one of the two sets of opposite sides of the substantially rectangular shape, the first extending portion being substantially entirely embedded in the in-mold foamed molded product, and the second extending portion including an exposed portion which is exposed outside the in-mold foamed molded product and which follows shrinkage and expansion of the in-mold foamed molded product.

A method in accordance with one or more embodiments of the present invention is a method for producing an in-mold foamed molded product unit, the in-mold foamed molded product unit including: an in-mold foamed molded product made of a thermoplastic resin; and an insert material embedded in the in-mold foamed molded product, the insert material being formed into a frame-like shape which is a substantially rectangular shape, the insert material including a first extending portion corresponding to one of two sets of opposite sides of the substantially rectangular shape, and a second extending portion corresponding to another one of the two sets of opposite sides of the substantially rectangular shape, the method including the step of: molding the in-mold foamed molded product such that the insert material is embedded in the in-mold foamed molded product, in the step of molding the in-mold foamed molded product, the first extending portion being substantially entirely embedded in the in-mold foamed molded product, and in the step of molding the in-mold foamed molded product, the second extending portion being arranged such that a portion of the second extending portion is exposed outside the in-mold foamed molded product, the portion of the second extending portion following shrinkage and expansion of the in-mold foamed molded product.

In the above configuration of one or more embodiments, since the first extending portion is substantially entirely embedded in the in-mold foamed molded product, the insert material is sufficiently firmly fixed to the in-mold foamed molded product. This makes it possible to reduce the risk that the in-mold foamed molded product unit may have insufficient strength.

Further, the second extending portion of one or more embodiments has the exposed portion which is exposed outside the in-mold foamed molded product and which follows shrinkage and expansion of the in-mold foamed molded product. This makes it possible to reduce the risk that the insert material may impede shrinkage and expansion of the in-mold foamed molded product in the vicinity of the second extending portion. This makes it easy to form the in-mold foamed molded product into a desired shape. Further, since it becomes possible to prevent deviation of an amount of deformation of the in-mold foamed molded product from a predicted amount, it also becomes easy to fabricate a mold for insert molding.

Therefore, with the above configuration of one or more embodiments, it is possible to provide a sufficiently strong in-mold foamed molded product unit whose mold for insert molding is easily fabricated since the in-mold foamed molded product can be easily formed into a desired shape.

One or more embodiments of the present invention make it possible to provide an in-mold foamed molded product unit which not only makes it easy to form an in-mold foamed molded product into a desired shape but also has a sufficient strength.

BRIEF DESCRIPTION OF THE DRAWINGS

FIG. 11 is a perspective view schematically illustrating an in-mold foamed molded product unit in accordance with a tenth example application of the in-mold foamed molded product unit illustrated in FIG. 1.

FIG. 12 is a perspective view schematically illustrating an in-mold foamed molded product unit in accordance with an eleventh example application of the in-mold foamed molded product unit illustrated in FIG. 1.

FIG. 17(A) shows the distribution in the in-mold foamed molded product unit illustrated in FIG. 1, and FIG. 17(B) shows the distribution in the in-mold foamed molded product unit illustrated in FIG. 16.

FIG. 19(A) shows the distribution of the amount of deformation in a shorter-side direction of the in-mold foamed molded product unit, FIG. 19(B) shows the distribution of the amount of deformation in a longer-side direction of the in-mold foamed molded product unit, and FIG. 19(C) shows the distribution of the amount of deformation in a vertical direction of the in-mold foamed molded product unit.

FIG. 20(A) shows the distribution of the amount of deformation in a shorter-side direction of the in-mold foamed molded product unit, FIG. 20(B) shows the distribution of the amount of deformation in a longer-side direction of the in-mold foamed molded product unit, and FIG. 20(C) shows the distribution of the amount of deformation in a vertical direction of the in-mold foamed molded product unit.

FIG. 22(A) shows the distribution of the amount of deformation in a shorter-side direction of the in-mold foamed molded product unit, FIG. 22(B) shows the distribution of the amount of deformation in a longer-side direction of the in-mold foamed molded product unit, and FIG. 22(C) shows the distribution of the amount of deformation in a vertical direction of the in-mold foamed molded product unit.

DETAILED DESCRIPTION OF THE EMBODIMENTS

The following will discuss one or more embodiments of the present invention with reference to FIGS. 1 to 22.

Figure 1:
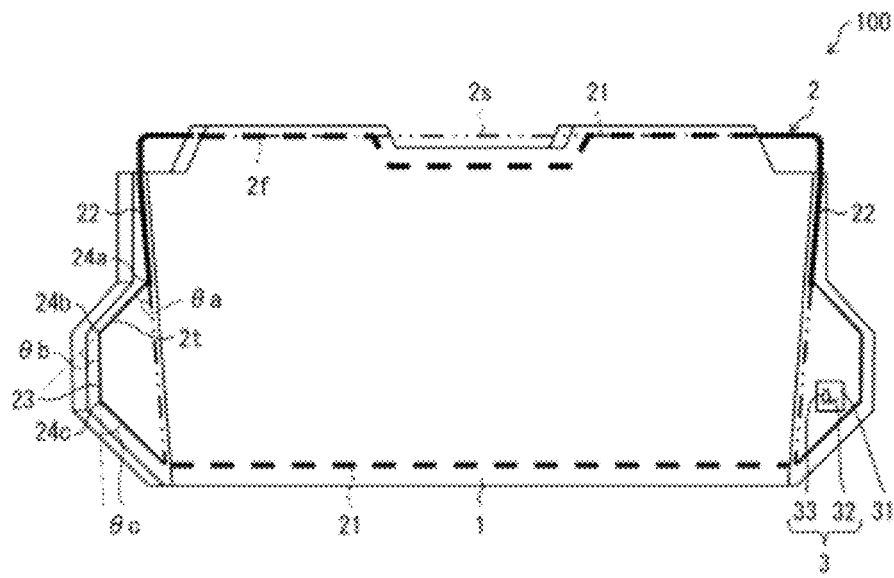
FIG. 1 is a perspective view schematically illustrating an in-mold foamed molded product unit in accordance with one or more embodiments of the present invention.

FIG. 1 is a perspective view schematically illustrating an in-mold foamed molded product unit 100 in accordance with one or more embodiments of the present invention. The in-mold foamed molded product unit 100 includes an in-mold foamed molded product 1, an insert material 2, and a retainer 3. The in-mold foamed molded product unit 100 is obtained by insert molding in which the insert material 2 is provided in the in-mold foamed molded product 1.

The in-mold foamed molded product 1 of one or more embodiments is made of a thermoplastic resin. The in-mold foamed molded product 1 is preferably made of an olefin-based resin for the following reasons. That is, the in-mold foamed molded product 1 made of an olefin-based resin brings about an effect of one or more embodiments of the present invention in a remarkable manner and also, is excellent in shock-absorbing property, chemical resistance, heat resistance, and strain recovery rate after compression. Further, the in-mold foamed molded product 1 made of an olefin-based resin allows for easy recycling. In light of this, the in-mold foamed molded product 1 is preferably a product obtained by in-mold foam molding of polyolefin-based resin expanded particles.

For example, the thermoplastic resin constituting the in-mold foamed molded product 1 is a polymer which contains not less than 75% by weight of an olefin-based monomer.

Examples of the olefin-based monomer encompass α-olefins having 2 to 12 carbon atoms, such as ethylene, propylene, butene-1, isobutene, pentene-1, 3-methyl-butene-1, hexene-1, 4-methyl-pentene-1, 3,4-dimethyl-butene-1, heptene-1, 3-methyl-hexene-1, octene-1, and decene-1. Each of these olefin-based monomers can be used solely. Alternatively, two or more of these olefin-based monomers can be used in combination.

Examples of another monomer copolymerizable with the olefin-based monomer encompass: cyclic olefins such as cyclopentene, norbornene, 1,4,5,8-dimethano-1,2,3,4,4a,8,8a,6-octahydronaphthalene; and dienes such as 5-methylene-2-norbornene, 5-ethylidene-2-norbornene, 1,4-hexadiene, methyl-1,4-hexadiene, and 7-methyl-1,6-octadiene. Each of these monomers can be used solely. Alternatively, two or more of these monomers can be used in combination.

Specific examples of the polyolefin-based resin encompass polyethylene-based resins containing ethylene as a main component, such as high-density polyethylene, medium-density polyethylene, low-density polyethylene, and linear low-density polyethylene; and polypropylene-based resins containing propylene as a main component. Each of these polyolefin-based resins can be used solely. Alternatively, two or more of these polyolefin-based resins can be used in combination.

In particular, a polypropylene-based resin containing, as a monomer component(s) copolymerizable with propylene, ethylene and/or butene-1 as an α-olefin(s) is preferably used for in-mold foam molding, since the polypropylene-based resin is easily available and excellent in processability/moldability. Among polyethylene-based resins, an ethylene-α-olefin block copolymer containing 1% by weight to 10% by weight of a comonomer other than ethylene or a linear low-density polyethylene can be preferably used for in-mold foam molding, since these polyethylene-based resins exhibit a preferable foamability.

The polypropylene-based resin is not particularly limited, provided that the polypropylene-based resin contains propylene as a main component of a monomer. Examples of the polypropylene-based resin encompass propylene homopolymers, α-olefin-propylene random copolymers, and α-olefin-propylene block copolymers. Each of these polypropylene-based resins can be used solely. Alternatively, two or more of these polypropylene-based resins can be used in combination.

Further, the polyolefin-based resin for use in one or more embodiments of the present invention may be used as needed as a polyolefin-based resin composition in which an additive(s) is/are added. Examples of the additive(s) encompass a cell nucleating agent (e.g., talc), stabilizers (e.g., an antioxidant, a metal deactivator, a phosphorus-based processing stabilizer, an ultraviolet absorber, an ultraviolet stabilizer, a fluorescent brightening agent, and metallic soap), a crosslinking agent, a chain transfer agent, a lubricant, a plasticizer, a filler, a reinforcing agent, an inorganic pigment, an organic pigment, a conductivity modifier, a flame-retardancy modifier, a surfactant-type antistatic agent, and a polymer-type antistatic agent.

The polyolefin-based resin composition for use in one or more embodiments of the present invention is usually shaped in advance into polyolefin-based resin particles having a desired particle shape such as a columnar shape, an elliptical shape, a spherical shape, a cubic shape, or a rectangular-parallelepiped shape, for easy use in pre-expansion. The polyolefin-based resin composition shaped into such particles is obtained by melt-kneading, together with the above-described additive(s) if necessary, the polyolefin-based resin by use of an extruder, a kneader, a Banbury mixer, a roller, or the like, and shaping the polyolefin-based resin thus obtained by melt-kneading.

Note that the polyolefin-based resin expanded particles for use in one or more embodiments of the present invention can be obtained through a foaming step by, for example, (i) dispersing polyolefin-based resin particles and a foaming agent such as carbon dioxide together into an aqueous dispersion medium in a pressure-resistant container, (ii) applying pressure to and heating a dispersion obtained in (i) until the temperature of the dispersion reaches a temperature not less than the softening temperature of the polyolefin-based resin particles, (iii) keeping the dispersion under the pressure and at the temperature not less than the softening temperature for a certain period of time, and then (iv) releasing the dispersion into a region under a pressure lower than an internal pressure of the pressure-resistant container. Note that a method for obtaining the polyolefin-based resin expanded particles is not limited to the above-described method. More specifically, it is possible to employ any of production methods disclosed in PCT International Publication No. WO 2009/075208, Japanese Patent Application Publication, Tokukai, No. 2006-117842, and the like.

Such polyolefin-based resin expanded particles are commercially sold under trade names such as EPERAN-PP and EPERAN-XL (both of which are manufactured by Kaneka Corporation) and are easily available.

Further, examples of the thermoplastic resin other than the olefin-based resins encompass styrene-based resins, styrene-modified olefin-based resins, polyester-based resins, polycarbonate-based resins, polyphenylene ether-based resins, polyvinylidene chloride-based resins, and polylactide-based resins. Styrene-based resin expanded particles can be obtained by any of production methods disclosed in Japanese Patent Application Publication, Tokukai, No. 2003-201360, Japanese Patent Application Publication, Tokukai, No. 2014-118474, PCT International Publication No. WO 2015/137363, and the like. Meanwhile, styrene-modified olefin-based resin expanded particles can be obtained by any of production methods disclosed in Japanese Patent Application Publication, Tokukai, No. 2008-239794, PCT International Publication No. WO 2016/152243, and the like.

In one or more embodiments, the insert material 2 is embedded in the in-mold foamed molded product 1. The insert material 2 is made of at least one linear member. The insert material 2 can be made of any of a variety of materials, provided that the insert material 2 is stronger against breakage (i.e., has a higher tensile strength) than the in-mold foamed molded product 1. In other words, the insert material 2 can be made of any of a variety of materials, provided that the insert material 2 is harder than the in-mold foamed molded product 1, or, provided that the insert material 2 is less easily broken than the in-mold foamed molded product 1 in a case where the material of the insert material 2 is softer than the in-mold foamed molded product 1. Possible examples of the material of the insert material 2 encompass metal, inorganic fiber (carbon fiber, glass fiber, and the like), fiber reinforced plastic (carbon fiber reinforced plastic, glass fiber reinforced plastic, and the like), fiber reinforced metal, wood, and concrete. Out of these examples, metal wire is preferable as the material of the insert material 2. Examples of the metal which can be used for the insert material 2 encompass iron, stainless steel, zinc, aluminum, and the like.

In one or more embodiments, the insert material 2 is formed into a substantially rectangular frame-like shape. More specifically, on the assumption that the insert material 2 is provided along four sides of an imaginary rectangle 2s, the insert material 2 is formed such that when bent and/or curved, the insert material 2 can be drawn apart from a corresponding side of the rectangle 2s. In FIG. 1, portions of the insert material 2, which portions correspond to one of two sets of opposite sides of the rectangle 2s, are designated as a first extending portion 21. Meanwhile, the other portions of the insert material 2, which portions correspond to the other one of the two sets of opposite sides, are designated as a second extending portion 22. The opposite sides of the rectangle 2s, which sides correspond to the first extending portion 21, are substantially along a longer-side direction of the in-mold foamed molded product unit 100. Meanwhile, the opposite sides of the rectangle 2s, which sides correspond to the second extending portion 22, are substantially along a shorter-side direction of the in-mold foamed molded product unit 100. Note that in a case where the in-mold foamed molded product unit 100 is attached to a vehicle, the longer-side direction of the in-mold foamed molded product unit 100 corresponds to a width direction of the vehicle, whereas the shorter-side direction of the in-mold foamed molded product unit 100 corresponds to a front-rear direction of the vehicle.

In one or more embodiments, the first extending portion 21 is substantially entirely embedded in the in-mold foamed molded product 1. More specifically, the first extending portion 21 is entirely embedded in the in-mold foamed molded product 1, except for a portion of the first extending portion 21 which portion is, for some reason, unsuitable for embedment in the in-mold foamed molded product 1. One example of such a portion of the first extending portion 21, which portion is unsuitable for embedment in the in-mold foamed molded product 1, is a portion which is provided at a position where embedment of the portion in the in-mold foamed molded product 1 is difficult due to an outer shape of the in-mold foamed molded product 1.

In the in-mold foamed molded product unit 100 of one or more embodiments, since the first extending portion 21 is substantially entirely embedded in the in-mold foamed molded product 1, the insert material 2 is sufficiently firmly fixed to the in-mold foamed molded product 1. This makes it possible to reduce the risk that the in-mold foamed molded product unit 100 may have insufficient strength.

In contrast, the second extending portion 22 of one or more embodiments includes an exposed portion 23 which is exposed outside the in-mold foamed molded product 1 and which follows shrinkage and expansion of the in-mold foamed molded product 1. The exposed portion 23 is at least a portion of the second extending portion 22 (it can be a portion or the whole of the second extending portion 22). The expression "exposed portion 23 . . . follows shrinkage . . . of the in-mold foamed molded product 1" herein means that the exposed portion 23 is subjected to force caused by shrinkage of the in-mold foamed molded product 1 and deforms as if the exposed portion 23 follows deformation of the in-mold foamed molded product 1 due to the shrinkage. The expression "exposed portion 23 . . . follows . . . expansion of the in-mold foamed molded product 1" herein means that the exposed portion 23 is subjected to force caused by expansion of the in-mold foamed molded product 1 and deforms as if the exposed portion 23 follows deformation of the in-mold foamed molded product 1 due to the expansion. With regard to the second extending portion 22 corresponding to each one of the opposite sides of the rectangle 2s, the proportion of the exposed portion 23 relative to the whole of the second extending portion 22 is preferably not less than 10% and not more than 90%, more preferably not less than 30% and not more than 80%, and still more preferably not less than 55% and not more than 65%.

This makes it possible to reduce the risk that the insert material 2 may impede the shrinkage and the expansion of the in-mold foamed molded product 1 in the vicinity of the second extending portion 22. This makes it easy to form the in-mold foamed molded product 1 into a desired shape. Further, since it becomes possible to prevent deviation of an amount of deformation of the in-mold foamed molded product 1 from a predicted amount, it also becomes easy to fabricate a mold for insert molding.

Therefore, it is possible to provide the in-mold foamed molded product unit 100 whose mold for insert molding is easily fabricated since the in-mold foamed molded product 1 can be easily formed into a desired shape, and whose strength is sufficient.

Note that the insert material 2 of the exposed portion 23 can be fit in a groove which is formed in the in-mold foamed molded product 1, or alternatively be provided on the in-mold foamed molded product 1.

Further, in the in-mold foamed molded product unit 100, one of the two sets of opposite sides of the rectangle 2s corresponds to the longer-side direction of the in-mold foamed molded product unit 100, whereas the other set of the two sets of opposite sides of the rectangle 2s corresponds to the shorter-side direction of the in-mold foamed molded product unit 100. This can make a region where the insert material 2 is embedded in the in-mold foamed molded product 1 sufficiently large, so that it is possible to easily provide the in-mold foamed molded product unit 100 whose strength is sufficient.

In one or more embodiments, the insert material 2 includes a thick portion 2f having a diameter (thickness) of, for example, 4.0 mmϕ and a thin portion 2t having a diameter of, for example, 2.5 mmϕ. Note that in order to make the insert material 2 have both the thick portion 2f and the thin portion 2t, the insert material 2 can be produced by processing one linear member or alternatively be produced by joining two or more linear members.

More specifically, in order to have a sufficiently high strength, the first extending portion 21 of one or more embodiments is made of only the thick portion 2f. In contrast, the second extending portion 22 has both the thick portion 2f and the thin portion 2t. Further, the thin portion 2t is used for a portion of the insert material 2 which portion constitutes the exposed portion 23 so that the insert material 2 easily deflects. Note that the thin portion 2t can be used for an entire portion of the insert material 2 which portion constitutes the exposed portion 23. With regard to the second extending portion 22 corresponding to the each one of the opposite sides, a proportion of the thin portion 2t relative to the whole of the second extending portion 22 is preferably not less than 30% and not more than 70%, more preferably not less than 40% and not more than 60%, and still more preferably not less than 40% and not more than 50%.

In view of the above, it can be said that the thickness of the insert material 2 at at least a portion of the exposed portion 23 can be smaller than that in the first extending portion 21.

Further, the exposed portion 23 has three bent portions 24a to 24c as bent portions of the insert material 2. The insert material 2 is bent at the bent portions 24a to 24c so as to make respective bending angles θa to θc. The bending angles θa to θc are each preferably an acute angle as illustrated in FIG. 1, but can alternatively be a right angle or an obtuse angle. Further, the exposed portion 23 can have four or more bent portions of the insert material 2.

Since the above configuration of one or more embodiments allows the insert material 2 of the exposed portion 23 to easily move, it is possible to further reduce the risk that the insert material 2 may impede the shrinkage and the expansion of the in-mold foamed molded product 1 in the vicinity of the second extending portion 22. Further, this makes it possible to reduce the amount of deformation of the in-mold foamed molded product 1 in the shorter-side direction of the in-mold foamed molded product unit 100. This is because when the in-mold foamed molded product 1 shrinks and expands, the in-mold foamed molded product 1 is not affected by the insert material 2 which shrinks and expands to only a very small extent. More specifically, the insert material 2, which shrinks or expands to only a very small extent, can follow the shrinkage and the expansion of the in-mold foamed molded product 1 because the insert material 2 deflects.

Further, since the bent portions 24a to 24c are present, the insert material 2 easily deforms while the bent portions 24a to 24c each serve as a starting point of bending. This allows the insert material 2 to easily follow the shrinkage and the expansion of the in-mold foamed molded product 1. Therefore, the amount of deformation of the in-mold foamed molded product 1 can be reduced. In a case where many bent portions are provided and the exposed portion 23 is arranged to have a spring structure, the amount of deformation of the in-mold foamed molded product 1 can be easily reduced further.

Note that though in FIG. 1, the exposed portion 23 is provided at respective ends of the in-mold foamed molded product unit 100 in the longer-side direction of the in-mold foamed molded product unit 100, the exposed portion 23 may be provided at only one end of the in-mold foamed molded product unit 100 in the longer-side direction. Note also that it becomes easy to ensure the strength of the in-mold foamed molded product unit 100 by providing the exposed portion 23 along an edge(s) of the in-mold foamed molded product 1.

In one or more embodiments, the retainer 3 is fixed to a plate-like member 31 made of, for example, iron. Note that the plate-like member 31 is fixed to, for example, the insert material 2. The retainer 3 has a function to fix the in-mold foamed molded product unit 100 to a vehicle, by being hooked on a hook on the vehicle. The material of the retainer 3 can be the same as that of the insert material 2.

In one or more embodiments, the retainer 3 has a base portion 32 which is fixed to the plate-like member 31, and a main portion 33. The base portion 32 and the main portion 33 are joined to each other in the shape of the letter L, when laterally viewed. In FIG. 1, the main portion 33 is a U-shaped hook. Note, however, that the shape of the main portion 33 is not particularly limited, provided that the shape of the main portion 33 allows the main portion 33 to be hooked on a hook on a vehicle. The main portion 33 can be, for example, a channel-shaped hook. Note also that the insert material 2 may be or may not be joined to the retainer 3 and/or the plate-like member 31.

In the present configuration of one or more embodiments, in the in-mold foamed molded product unit 100, the retainer 3 is entirely exposed outside the in-mold foamed molded product 1. The plate-like member 31 only needs to be embedded in the in-mold foamed molded product 1 to an extent which is necessary to fix, at a desired strength, the plate-like member 31 in the in-mold foamed molded product unit 100. Accordingly, the plate-like member 31 may or may not have a portion exposed outside the in-mold foamed molded product 1.

The retainer 3 of one or more embodiments may disadvantageously impede shrinkage and expansion of the in-mold foamed molded product 1 due to a principle similar to that in the case of the insert material 2. The above configuration makes it possible to reduce the risk that the retainer 3 may impede the shrinkage and the expansion of the in-mold foamed molded product 1 in the vicinity of the retainer 3. This makes it easy to form the in-mold foamed molded product 1 into a desired shape. Further, since it becomes possible to prevent deviation of an amount of deformation of the in-mold foamed molded product 1 from a predicted amount, it also becomes easy to fabricate a mold for insert molding.

Applications of the in-mold foamed molded product unit 100 include an application for a core material of a vehicle seat. Concrete examples of the applications include an application for a core material of a seat part of a vehicle seat or for a core material of a backrest part of a vehicle seat.

Example Applications

Figure 2:
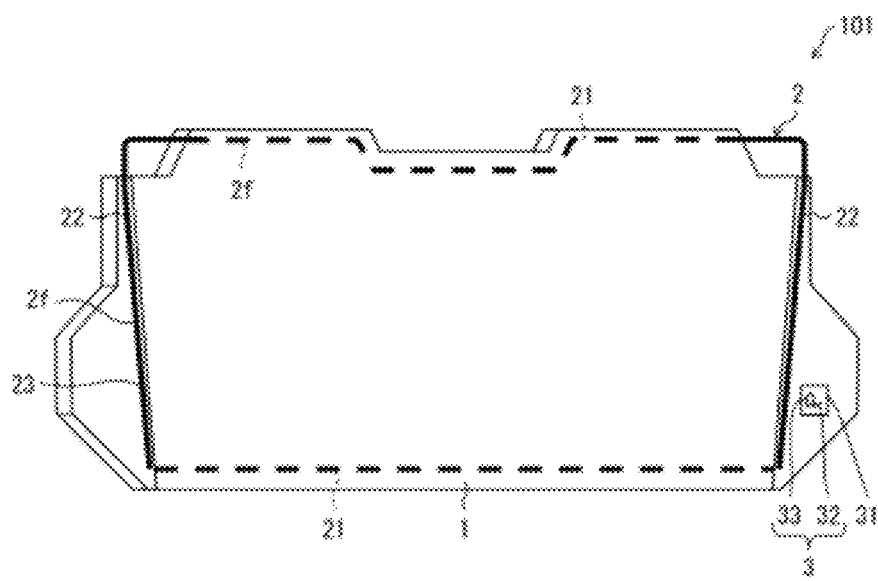
FIG. 2 is a perspective view schematically illustrating an in-mold foamed molded product unit in accordance with a first example application of the in-mold foamed molded product unit illustrated in FIG. 1.

FIG. 2 is a perspective view schematically illustrating an in-mold foamed molded product unit 101 in accordance with a first example application of the in-mold foamed molded product unit 100 of one or more embodiments illustrated in FIG. 1. The in-mold foamed molded product unit 101 is different from the in-mold foamed molded product unit 100 as below.

In one or more embodiments, the in-mold foamed molded product unit 101 is configured such that the second extending portion 22 is made of only the thick portion 2f. Further, the in-mold foamed molded product unit 101 is not provided with any bent portion of the insert material 2, which bent portion corresponds to any of the bent portions 24a to 24c in the in-mold foamed molded product unit 100.

Figure 3:
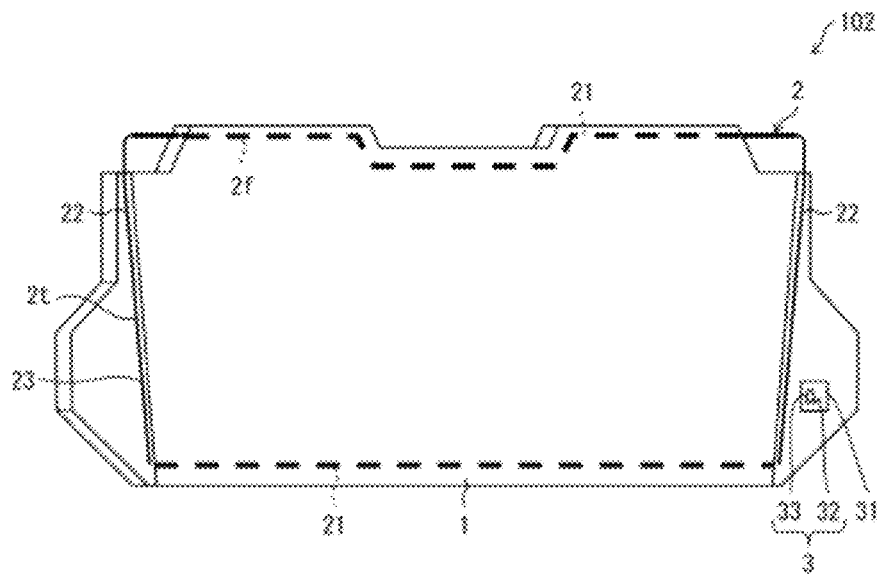
FIG. 3 is a perspective view schematically illustrating an in-mold foamed molded product unit in accordance with a second example application of the in-mold foamed molded product unit illustrated in FIG. 1.

FIG. 3 is a perspective view schematically illustrating an in-mold foamed molded product unit 102 in accordance with a second example application of the in-mold foamed molded product unit 100 illustrated in FIG. 1. The in-mold foamed molded product unit 102 is different from the in-mold foamed molded product unit 100 as below.

In one or more embodiments, the in-mold foamed molded product unit 102 is configured such that the second extending portion 22 is made of only the thin portion 2t. Further, the in-mold foamed molded product unit 102 is not provided with any bent portion of the insert material 2, which bent portion corresponds to any of the bent portions 24a to 24c in the in-mold foamed molded product unit 100.

Figure 4:
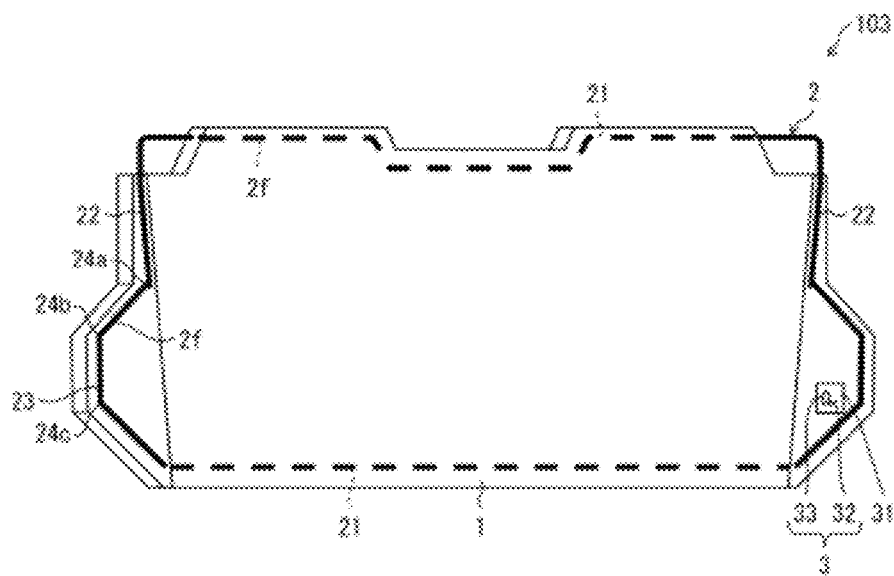
FIG. 4 is a perspective view schematically illustrating an in-mold foamed molded product unit in accordance with a third example application of the in-mold foamed molded product unit illustrated in FIG. 1.

FIG. 4 is a perspective view schematically illustrating an in-mold foamed molded product unit 103 in accordance with a third example application of the in-mold foamed molded product unit 100 illustrated in FIG. 1. The in-mold foamed molded product unit 103 is different from the in-mold foamed molded product unit 100 as below.

In one or more embodiments, the in-mold foamed molded product unit 103 is configured such that the second extending portion 22 is made of only the thick portion 2f.

Figure 5:
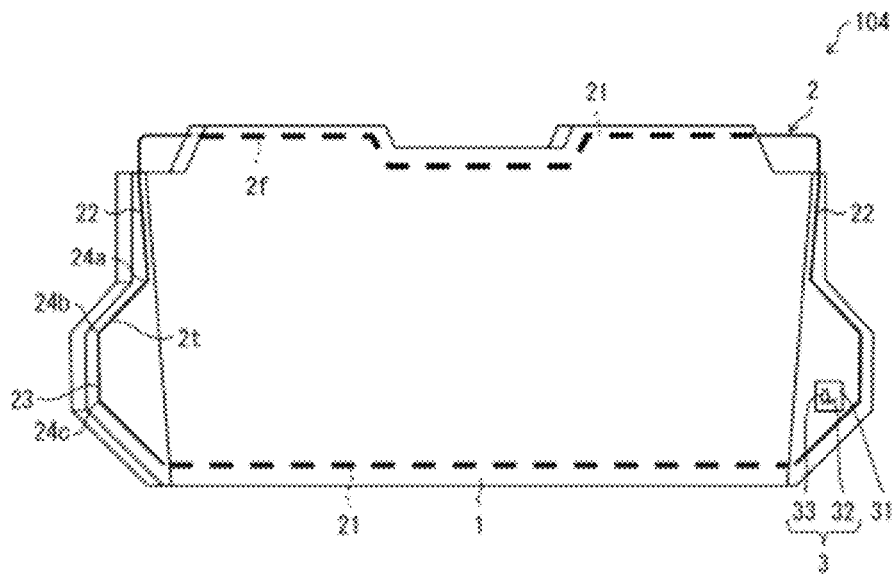
FIG. 5 is a perspective view schematically illustrating an in-mold foamed molded product unit in accordance with a fourth example application of the in-mold foamed molded product unit illustrated in FIG. 1.

FIG. 5 is a perspective view schematically illustrating an in-mold foamed molded product unit 104 in accordance with a fourth example application of the in-mold foamed molded product unit 100 illustrated in FIG. 1. The in-mold foamed molded product unit 104 is different from the in-mold foamed molded product unit 100 as below.

In one or more embodiments, the in-mold foamed molded product unit 104 is configured such that an entire portion of a portion exposed from an in-mold foamed molded product 1, which portion is a portion of the insert material 2, is made of only the thin portion 2t.

Figure 6:
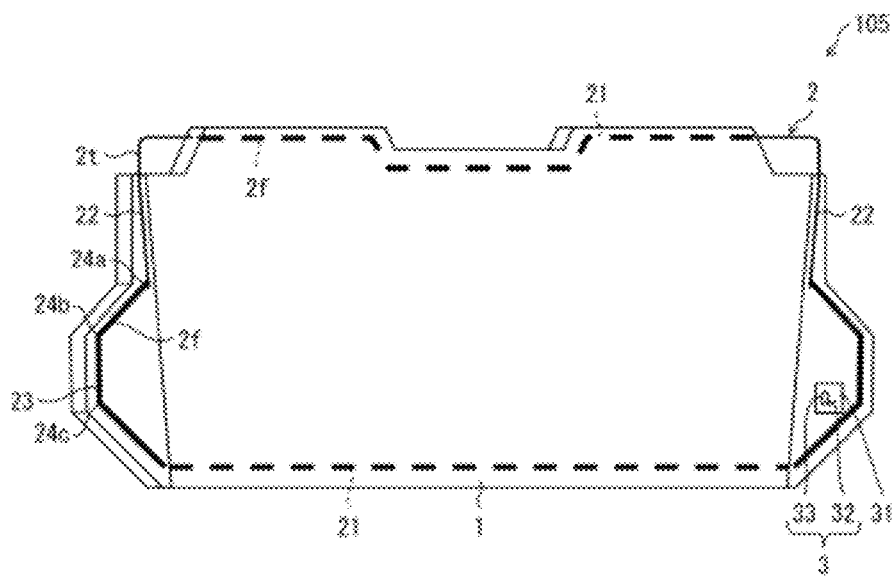
FIG. 6 is a perspective view schematically illustrating an in-mold foamed molded product unit in accordance with a fifth example application of the in-mold foamed molded product unit illustrated in FIG. 1.

FIG. 6 is a perspective view schematically illustrating an in-mold foamed molded product unit 105 in accordance with a fifth example application of the in-mold foamed molded product unit 100 illustrated in FIG. 1. The in-mold foamed molded product unit 105 is different from the in-mold foamed molded product unit 100 as below.

In a portion exposed from the in-mold foamed molded product 1 which portion is a portion of the insert material 2, the position of the thick portion 2f and the position of the thin portion 2t in the in-mold foamed molded product unit 105 are reversed from those in the in-mold foamed molded product unit 100.

Figure 7:
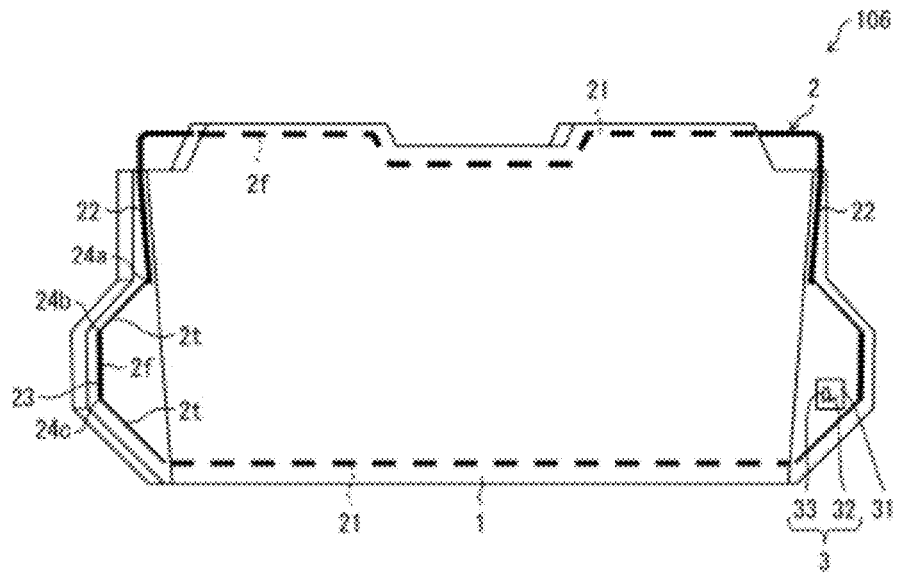
FIG. 7 is a perspective view schematically illustrating an in-mold foamed molded product unit in accordance with a sixth example application of the in-mold foamed molded product unit illustrated in FIG. 1.

FIG. 7 is a perspective view schematically illustrating an in-mold foamed molded product unit 106 in accordance with a sixth example application of the in-mold foamed molded product unit 100 illustrated in FIG. 1. The in-mold foamed molded product unit 106 is different from the in-mold foamed molded product unit 100 as below.

In one or more embodiments, the in-mold foamed molded product unit 106 is configured such that a portion between the bent portion 24b and the bent portion 24c is made of the thick portion 2f.

Figure 8:
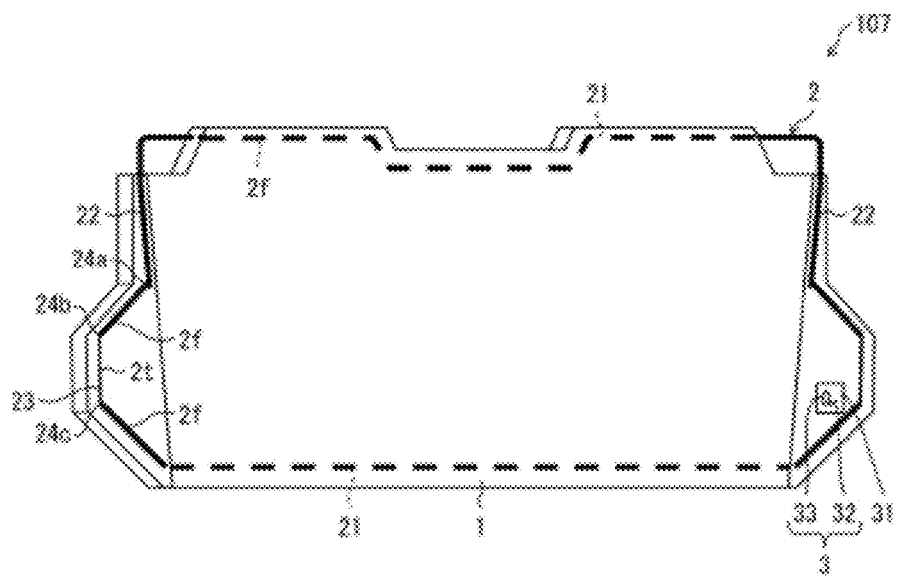
FIG. 8 is a perspective view schematically illustrating an in-mold foamed molded product unit in accordance with a seventh example application of the in-mold foamed molded product unit illustrated in FIG. 1.

FIG. 8 is a perspective view schematically illustrating an in-mold foamed molded product unit 107 in accordance with a seventh example application of the in-mold foamed molded product unit 100 illustrated in FIG. 1. The in-mold foamed molded product unit 107 is different from the in-mold foamed molded product unit 100 as below.

In one or more embodiments, the in-mold foamed molded product unit 107 is configured such that a portion between the bent portion 24a and the bent portion 24b and a portion between the bent portion 24c and an end of the second extending portion 22 (lower left in FIG. 8) are made of the thick portion 2f.

Figure 9:
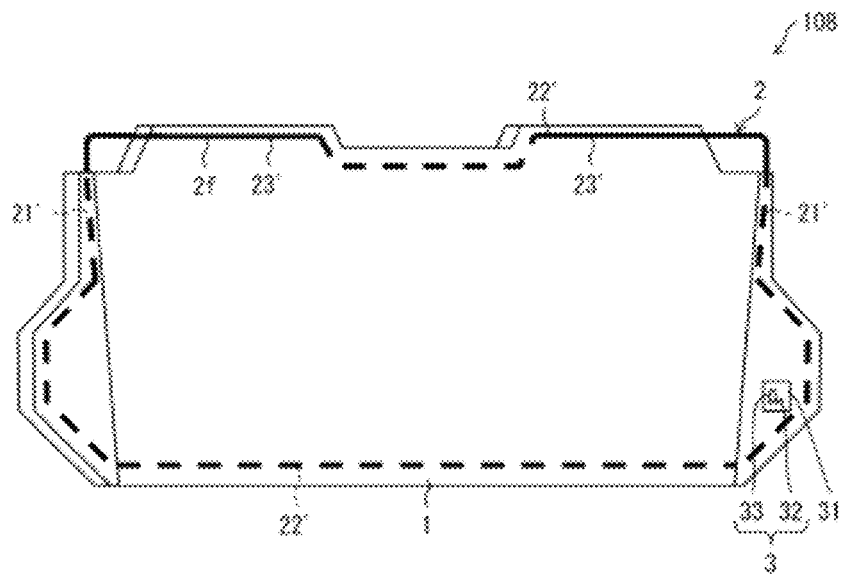
FIG. 9 is a perspective view schematically illustrating an in-mold foamed molded product unit in accordance with an eighth example application of the in-mold foamed molded product unit illustrated in FIG. 1.
Figure 10:
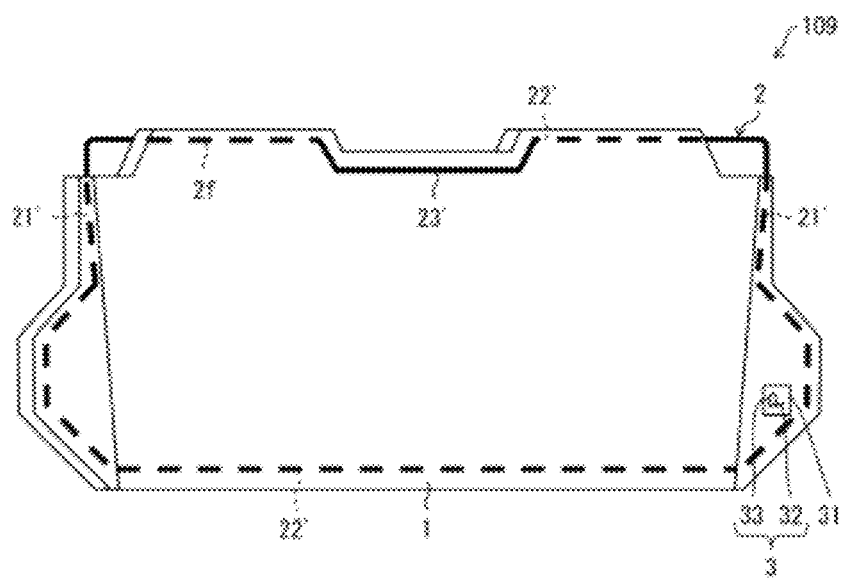
FIG. 10 is a perspective view schematically illustrating an in-mold foamed molded product unit in accordance with a ninth example application of the in-mold foamed molded product unit illustrated in FIG. 1.

FIG. 9 is a perspective view schematically illustrating an in-mold foamed molded product unit 108 in accordance with a eighth example application of the in-mold foamed molded product unit 100 illustrated in FIG. 1. FIG. 10 is a perspective view schematically illustrating an in-mold foamed molded product unit 109 in accordance with a ninth example application of the in-mold foamed molded product unit 100 illustrated in FIG. 1. Each of the in-mold foamed molded product units 108 and 109 is different from the in-mold foamed molded product unit 100 as below.

Each of the in-mold foamed molded product units 108 and 109 is configured such that the whole of the insert material 2 is made of only the thick portion 2f. Further, each of the in-mold foamed molded product units 108 and 109 is configured such that a first extending portion 21' is substantially entirely embedded in the in-mold foamed molded product 1 and a second extending portion 22' includes an exposed portion 23' which is exposed outside the in-mold foamed molded product 1 and which follows shrinkage and expansion of the in-mold foamed molded product 1. Note that the first extending portion 21' is a portion corresponding to the second extending portion 22 of the in-mold foamed molded product unit 100, and the second extending portion 22' is a portion corresponding to the first extending portion 21 of the in-mold foamed molded product unit 100.

In the in-mold foamed molded product unit 108 of one or more embodiments, the exposed portion 23' is provided so as to avoid a middle portion of the second extending portion 22' (top in FIG. 9). Meanwhile, in the in-mold foamed molded product unit 109, the exposed portion 23' is a middle portion of the second extending portion 22' (top in FIG. 10).

Figure 13:
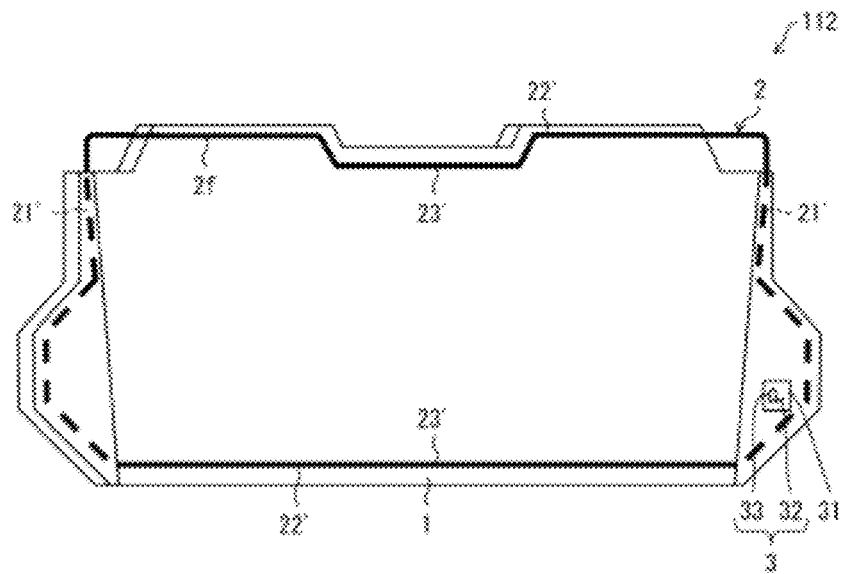
FIG. 13 is a perspective view schematically illustrating an in-mold foamed molded product unit in accordance with a twelfth example application of the in-mold foamed molded product unit illustrated in FIG. 1.

FIG. 11 is a perspective view schematically illustrating an in-mold foamed molded product unit 110 in accordance with a tenth example application of the in-mold foamed molded product unit 100 illustrated in FIG. 1. FIG. 12 is a perspective view schematically illustrating an in-mold foamed molded product unit 111 in accordance with a eleventh example application of the in-mold foamed molded product unit 100 illustrated in FIG. 1. FIG. 13 is a perspective view schematically illustrating an in-mold foamed molded product unit 112 in accordance with a twelfth example application of the in-mold foamed molded product unit 100 illustrated in FIG. 1. Each of the in-mold foamed molded product units 110 to 112 is different from the in-mold foamed molded product unit 100 as below.

Each of the in-mold foamed molded product units 110 to 112 is configured such that the whole of the insert material 2 is made of only the thick portion 2f. Further, each of the in-mold foamed molded product units 110 to 112 is configured such that a first extending portion 21' is substantially entirely embedded in the in-mold foamed molded product 1 and a second extending portion 22' includes an exposed portion 23'.

In the in-mold foamed molded product unit 110 of one or more embodiments, the exposed portion 23' is provided at one of opposite sides of the second extending portion 22'. In the in-mold foamed molded product unit 111, the exposed portion 23' is provided at the other one of the opposite sides of the second extending portion 22'. In the in-mold foamed molded product unit 112, the exposed portion 23' is provided at both of the opposite sides of the second extending portion 22'.

Figure 14:
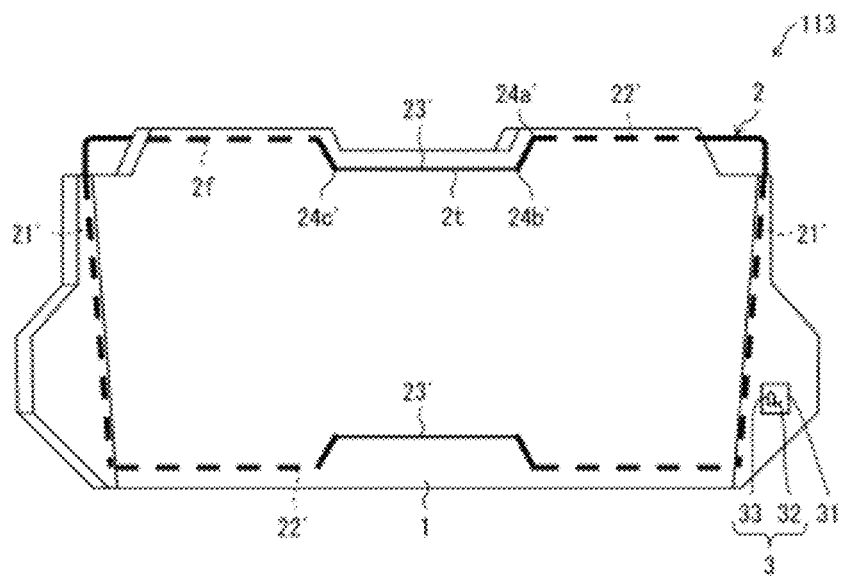
FIG. 14 is a perspective view schematically illustrating an in-mold foamed molded product unit in accordance with a thirteenth example application of the in-mold foamed molded product unit illustrated in FIG. 1.
Figure 15:
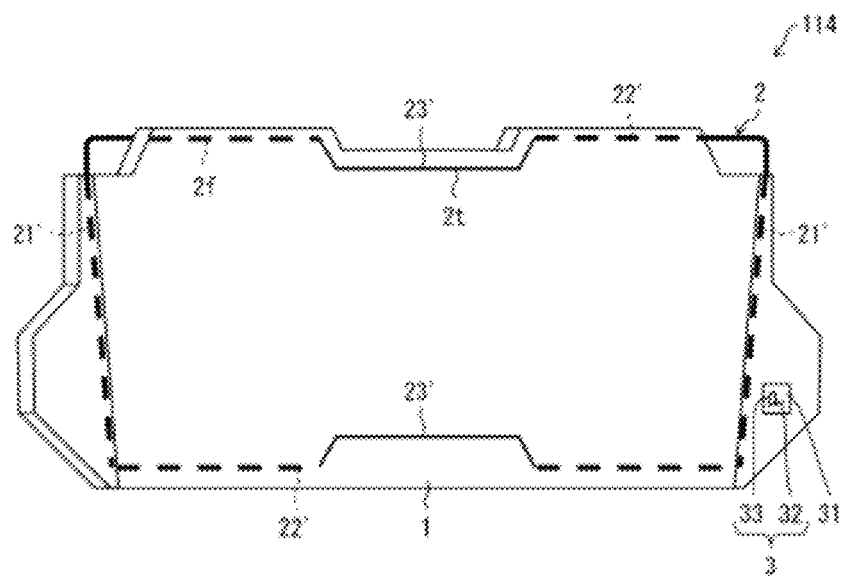
FIG. 15 is a perspective view schematically illustrating an in-mold foamed molded product unit in accordance with a fourteenth example application of the in-mold foamed molded product unit illustrated in FIG. 1.

FIG. 14 is a perspective view schematically illustrating an in-mold foamed molded product unit 113 in accordance with a thirteenth example application of the in-mold foamed molded product unit 100 illustrated in FIG. 1. FIG. 15 is a perspective view schematically illustrating an in-mold foamed molded product unit 114 in accordance with a fourteenth example application of the in-mold foamed molded product unit 100 illustrated in FIG. 1. Each of the in-mold foamed molded product units 113 and 114 is different from the in-mold foamed molded product unit 100 as below.

Each of the in-mold foamed molded product units 113 and 114 is configured such that a first extending portion 21' is substantially entirely embedded in the in-mold foamed molded product 1 and a second extending portion 22' includes an exposed portion 23' at a middle portion of the second extending portion 22'. Further, the exposed portion 23' of the in-mold foamed molded product unit 113 has three bent portions 24a' to 24c' as bent portions of the insert material 2. In the exposed portion 23' of the in-mold foamed molded product unit 113, a portion between the bent portion 24b' and a bent portion 24c' is made of the thin portion 2t and the other portions of the exposed portion 23' are made of the thick portion 2f. Meanwhile, the in-mold foamed molded product unit 114 is configured such that the whole of the exposed portion 23' is made of only the thin portion 2t.

[Recap]

An in-mold foamed molded product unit in accordance with one or more embodiments of the present invention includes: an in-mold foamed molded product made of a thermoplastic resin; and an insert material embedded in the in-mold foamed molded product, the insert material being formed into a frame-like shape which is a substantially rectangular shape, the insert material including a first extending portion corresponding to one of two sets of opposite sides of the substantially rectangular shape, and a second extending portion corresponding to another one of the two sets of opposite sides of the substantially rectangular shape, the first extending portion being substantially entirely embedded in the in-mold foamed molded product, and the second extending portion including an exposed portion which is exposed outside the in-mold foamed molded product and which follows shrinkage and expansion of the in-mold foamed molded product.

A method in accordance with one or more embodiments of the present invention is a method for producing an in-mold foamed molded product unit, the in-mold foamed molded product unit including: an in-mold foamed molded product made of a thermoplastic resin; and an insert material embedded in the in-mold foamed molded product, the insert material being formed into a frame-like shape which is a substantially rectangular shape, the insert material including a first extending portion corresponding to one of two sets of opposite sides of the substantially rectangular shape, and a second extending portion corresponding to another one of the two sets of opposite sides of the substantially rectangular shape, the method including the step of: molding the in-mold foamed molded product such that the insert material is embedded in the in-mold foamed molded product, in the step of molding the in-mold foamed molded product, the first extending portion being substantially entirely embedded in the in-mold foamed molded product, and in the step of molding the in-mold foamed molded product, the second extending portion being arranged such that a portion of the second extending portion is exposed outside the in-mold foamed molded product, the portion of the second extending portion following shrinkage and expansion of the in-mold foamed molded product.

In the above configuration of one or more embodiments, since the first extending portion is substantially entirely embedded in the in-mold foamed molded product, the insert material is sufficiently firmly fixed to the in-mold foamed molded product. This makes it possible to reduce the risk that the in-mold foamed molded product unit may have insufficient strength.

Further, the second extending portion has the exposed portion which follows shrinkage and expansion of the in-mold foamed molded product. This makes it possible to reduce the risk that the insert material may impede shrinkage and expansion of the in-mold foamed molded product in the vicinity of the second extending portion. This makes it easy to form the in-mold foamed molded product into a desired shape. Further, since it becomes possible to prevent deviation of an amount of deformation of the in-mold foamed molded product from a predicted amount, it also becomes easy to fabricate a mold for insert molding.

Therefore, with the above configuration of one or more embodiments, it is possible to provide a sufficiently strong in-mold foamed molded product unit whose mold for insert molding is easily fabricated since the in-mold foamed molded product can be easily formed into a desired shape.

An in-mold foamed molded product unit in accordance one or more embodiments of the present invention is configured preferably such that: at least a portion of the exposed portion of the insert material is thinner than the first extending portion of the insert material.

Further, an in-mold foamed molded product unit in accordance with one or more embodiments of the present invention is configured preferably such that: the exposed portion includes not less than three bent portions at each of which the insert material is bent.

Since in the above configuration of one or more embodiments, the insert material of the exposed portion easily moves, it is possible to further reduce the risk that the insert material may impede shrinkage and expansion of the in-mold foamed molded product in the vicinity of second extending portion. This makes it possible to reduce an amount of deformation of the in-mold foamed molded product in a direction substantially along a direction in which the another one of the two sets of opposite sides of the substantially rectangular shape extends. This is because when the in-mold foamed molded product shrinks and expands, the in-mold foamed molded product is not affected by the insert material which shrinks and expands to only a very small extent.

An in-mold foamed molded product unit in accordance with one or more embodiments of the present invention is configured preferably to further include: a retainer which is entirely exposed outside the in-mold foamed molded product.

The retainer of one or more embodiments may disadvantageously impede shrinkage and expansion of the in-mold foamed molded product due to a principle similar to that in the case of the insert material. The above configuration makes it possible to reduce the risk that the retainer may impede shrinkage and expansion of the in-mold foamed molded product in the vicinity of the retainer. This makes it easy to form the in-mold foamed molded product into a desired shape. Further, since it becomes possible to prevent deviation of an amount of deformation of the in-mold foamed molded product from a predicted amount, it also becomes easy to fabricate a mold for insert molding.

Further, an in-mold foamed molded product unit in accordance with one or more embodiments of the present invention is configured preferably such that: one of the two sets of opposite sides of the substantially rectangular shape corresponds to a longer-side direction of the in-mold foamed molded product unit; and another one of the two sets of opposite sides of the substantially rectangular shape corresponds to a shorter-side direction of the in-mold foamed molded product unit.

The above configuration makes it possible to have a sufficiently large portion of the insert material embedded in the in-mold foamed molded product, so that it is possible to easily provide the in-mold foamed molded product unit whose strength is sufficient.

Embodiments of the present invention are not limited to the embodiments discussed above, but can be altered by a skilled person in the art within the scope of the claims. One or more embodiments of the present invention also encompass, in their technical scope, any embodiment derived by combining technical means disclosed in differing embodiments.

EXAMPLES

Figure 16:
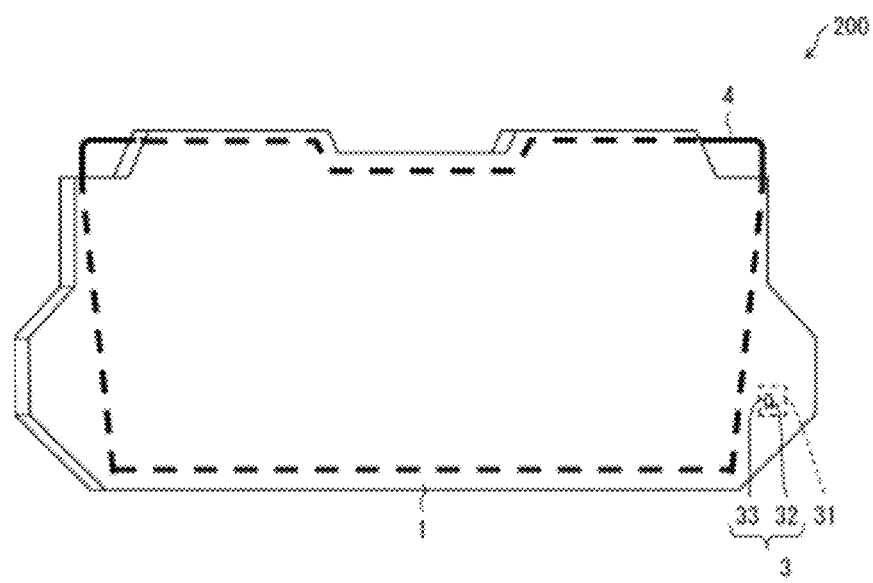
FIG. 16 is a perspective view schematically illustrating an in-mold foamed molded product unit in accordance with a comparative example of the present invention.

FIG. 16 is a perspective view schematically illustrating an in-mold foamed molded product unit 200 in accordance with a comparative example of the present invention. The in-mold foamed molded product unit 200 is different in the following (A) to (D) from the in-mold foamed molded product unit 100 illustrated in FIG. 1.

(A) Whereas the in-mold foamed molded product unit 100 has an exposed portion 23, the in-mold foamed molded product unit 200 does not have any exposed portion 23. Note that though in FIG. 16, portions of an insert material 4 are exposed at upper left and upper right corners of the in-mold foamed molded product unit 200, these portions of the insert material 4 are merely portions which are difficult to insert in an in-mold foamed molded product 1, and these portions of the insert material 4 are different from the exposed portion 23 (these portions do not follow shrinkage and expansion of the in-mold foamed molded product 1).

(B) Whereas the in-mold foamed molded product unit 100 includes an insert material 2 made of a thick portion 2$f$ and a thin portion 2$t$, the in-mold foamed molded product unit 200 includes, in place of the insert material 2, the insert material 4 made of only the thick portion 2$f$.

(C) Whereas the insert material 2 of the in-mold foamed molded product unit 100 has bent portions 24$a$ to 24$c$ in the exposed portion 23, the insert material 4 of the in-mold foamed molded product unit 200 has none of the bent portions 24$a$ to 24$c$.

(D) Whereas the in-mold foamed molded product unit 100 includes a retainer 3 which is entirely exposed, the in-mold foamed molded product unit 200 includes a retainer 3 such that a lower portion of a base portion 32 is embedded in the in-mold foamed molded product 1 (the lower portion is not exposed).

In an Example of one or more embodiments, a distribution of an amount of deformation of an in-mold foamed molded product 1 in the in-mold foamed molded product unit 100 was compared by simulation with that in the in-mold foamed molded product unit 200.

Figure 17A:
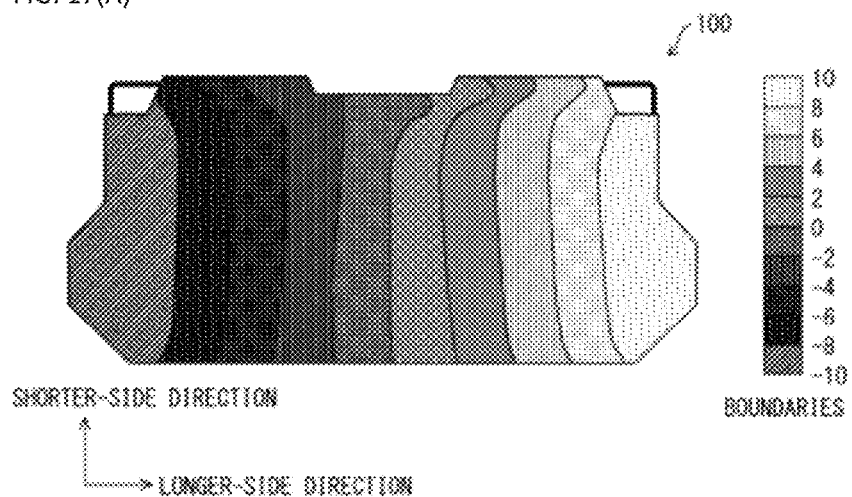
FIGS. 17(A) and 17(B) are plan views showing a distribution of an amount of deformation of an in-mold foamed molded product in a longer-side direction of each in-mold foamed molded product unit.
Figure 17B:
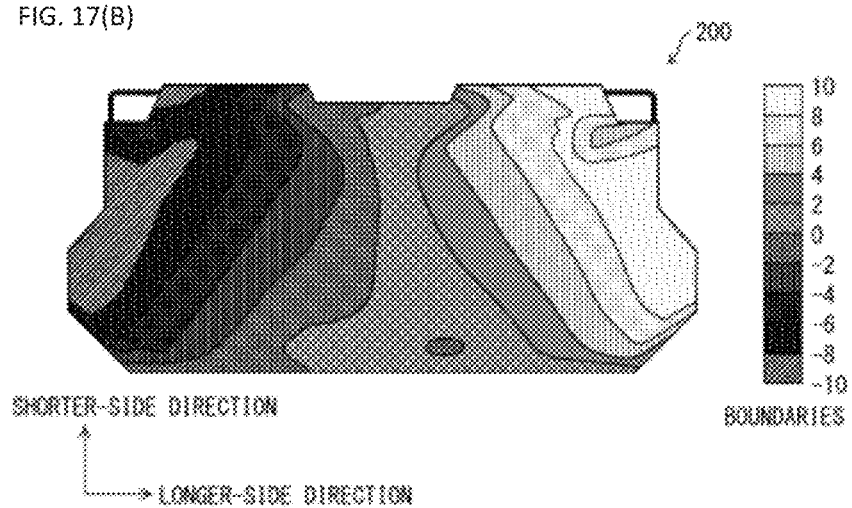

FIGS. 17(A) and 17(B) are plan views illustrating the distribution of the amount of deformation of the in-mold foamed molded product 1 in a longer-side direction of the in-mold foamed molded product unit. FIG. 17(A) shows the distribution in the in-mold foamed molded product unit 100, and FIG. 17(B) shows the distribution in the in-mold foamed molded product unit 200.

Figure 18A:
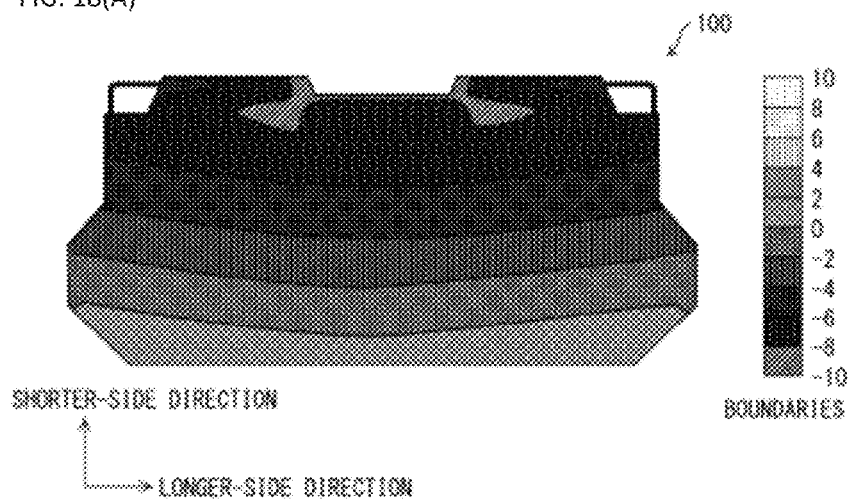
FIGS. 18(A) and 18(B) are plan views illustrating a distribution of an amount of deformation of an in-mold foamed molded product in a shorter-side direction of each in-mold foamed molded product unit. (a) of FIG. 18 shows the distribution in the in-mold foamed molded product unit illustrated in FIG. 1, and (b) of FIG. 18 shows the distribution in the in-mold foamed molded product unit illustrated in FIG. 16.
Figure 18B:
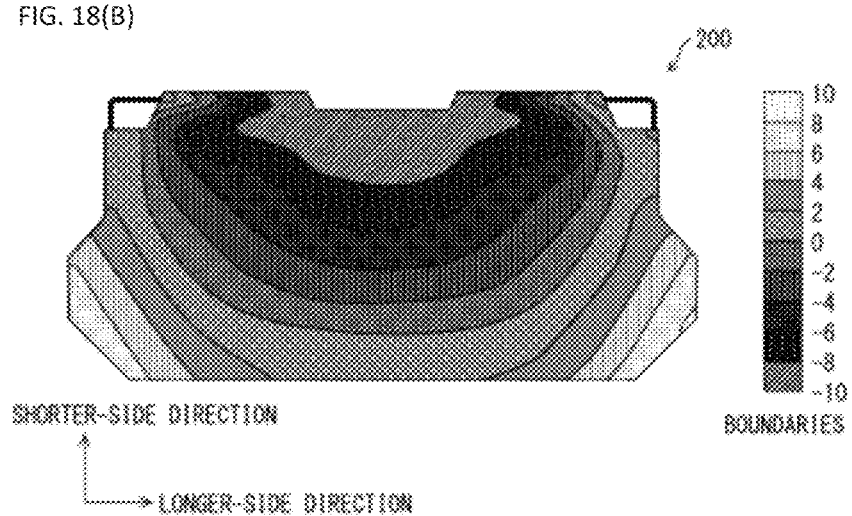

FIGS. 18(A) and 18(B) are plan views illustrating the distribution of the amount of deformation of the in-mold foamed molded product 1 in a shorter-side direction of the in-mold foamed molded product unit. FIG. 18(A) shows the distribution in the in-mold foamed molded product unit 100, and FIG. 18(B) shows the distribution in the in-mold foamed molded product unit 200.

Note that notations of −10 to 10 on the right-hand side of each of FIGS. 17(A)-(B) and 18(A)-(B) are numerical values (unit: mm) indicative of the amount of deformation. In FIGS. 17(A)-(B), positive values indicate deformation from a right side toward the center while negative values indicate deformation from a left side toward the center. In FIGS. 18(A)-(B), positive values indicate deformation toward an upper side whereas negative values indicate deformation toward a lower side. An apparatus used for measuring the above distributions was CATIA manufactured by Dassault Systems K.K.

In the distribution of the amount of deformation of the in-mold foamed molded product 1 in the longer-side direction of the in-mold foamed molded product unit 200, contour lines are extending in oblique directions on the in-mold foamed molded product unit 200 as shown in FIG. 17(B). On the other hand, in the distribution of the amount of deformation of the in-mold foamed molded product 1 in the longer-side direction of the in-mold foamed molded product unit 100, contour lines are organized so as to extend substantially along the shorter-side direction of the in-mold foamed molded product unit 100 as shown in FIG. 17(A). This revealed that the in-mold foamed molded product 1 of the in-mold foamed molded product unit 100 can be more easily formed into a desired shape because, unlike the contour lines of the in-mold foamed molded product unit 200, the contour lines (see FIG. 17(A)) of the in-mold foamed molded product unit 100 are organized in the distribution of the amount of deformation in the longer-side direction.

In the distribution of the amount of deformation of the in-mold foamed molded product 1 along the shorter-side direction of the in-mold foamed molded product unit 200, contour lines are extending radially on the in-mold foamed molded product unit 200 as shown in FIG. 18(B). On the other hand, in the distribution of the amount of deformation of the in-mold foamed molded product 1 in the shorter-side direction of the in-mold foamed molded product unit 100, contour lines are organized so as to extend substantially along the longer-side direction of the in-mold foamed molded product unit 100 as shown in FIG. 18(A). This revealed that the in-mold foamed molded product 1 of the in-mold foamed molded product unit 100 can be more easily formed into a desired shape because, unlike the contour lines of the in-mold foamed molded product unit 200, the contour lines (see FIG. 18(A)) of the in-mold foamed molded product unit 100 are organized in the distribution of the amount of deformation in the shorter-side direction.

Further, as compared to the distribution shown in FIG. 18(B), the distribution shown in FIG. 18(A) has no region where the numerical value indicative of the amount of deformation is not less than +2 mm. This revealed that the amount of deformation of the in-mold foamed molded product 1 in the shorter-side direction is smaller in the in-mold foamed molded product unit 100 than in the in-mold foamed molded product unit 200.

Notations of −10 to 10 on the right-hand side of each of FIGS. 19(A)-(C), 20(A)-(C), and 22(A)-(C) are each a numerical value (unit: mm) indicative of an amount of deformation. Deformation from a right side toward the center is indicated by positive values whereas deformation from a left side toward the center is indicated by negative values. Further, deformation toward an upper side is indicated by positive values whereas deformation toward a lower side is indicated by negative values. Furthermore, deformation in a direction from a back side to a front side of a paper sheet of a drawing is indicated by positive values whereas deformation in a direction from the front side to the back side of the paper sheet of the drawing is indicated by negative values. An apparatus used for measuring the above distributions was CATIA manufactured by Dassault Systems K.K.

Figure 19A:
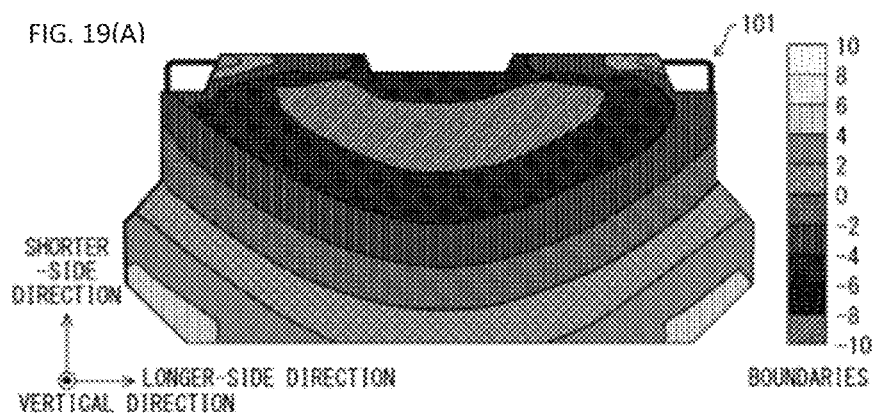
FIGS. 19(A)-(C) are plan views illustrating a distribution of an amount of deformation of an in-mold foamed molded product in the in-mold foamed molded product unit illustrated in FIG. 2.
Figure 19B:
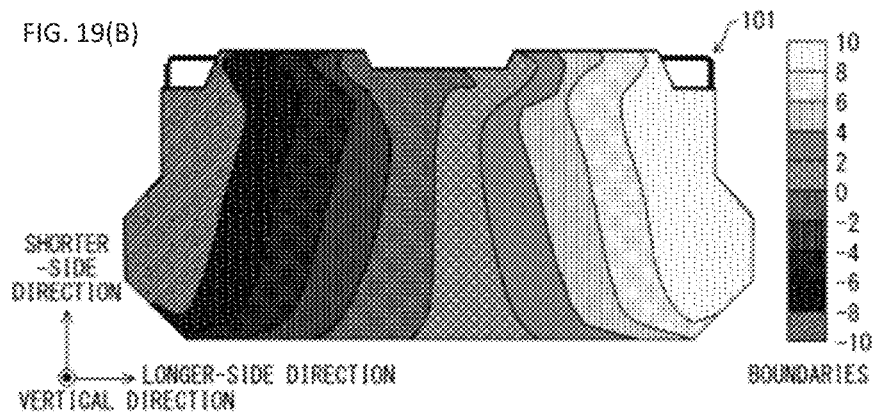
Figure 19C:
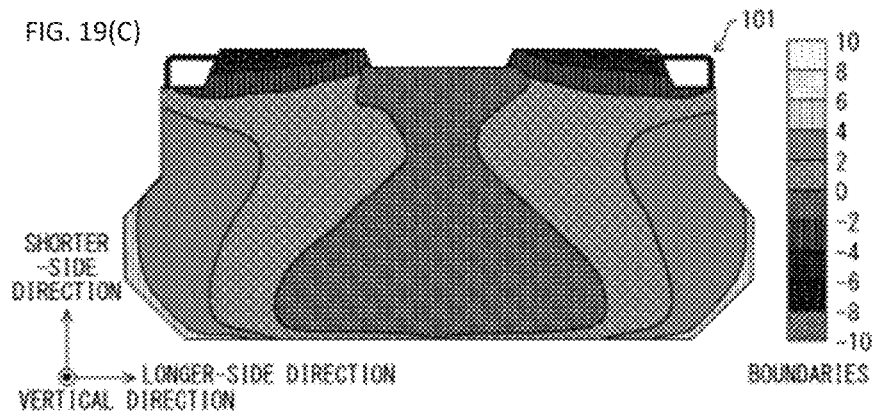

FIGS. 19(A)-(C) are plan views illustrating a distribution of an amount of deformation of an in-mold foamed molded product 1 of an in-mold foamed molded product unit 101 illustrated in FIG. 2. FIG. 19(A) shows the distribution of the amount of deformation in a shorter-side direction, FIG. 19(B) shows the distribution of the amount of deformation in a longer-side direction, and FIG. 19(C) shows the distribution of the amount of deformation in a vertical direction (in a direction perpendicular to both of the shorter-side direction and the longer-side direction). It is clear from FIGS. 19(A)-(C) that the in-mold foamed molded product 1 of the in-mold foamed molded product unit 101 can be easily formed into a desired shape.

Figure 20A:
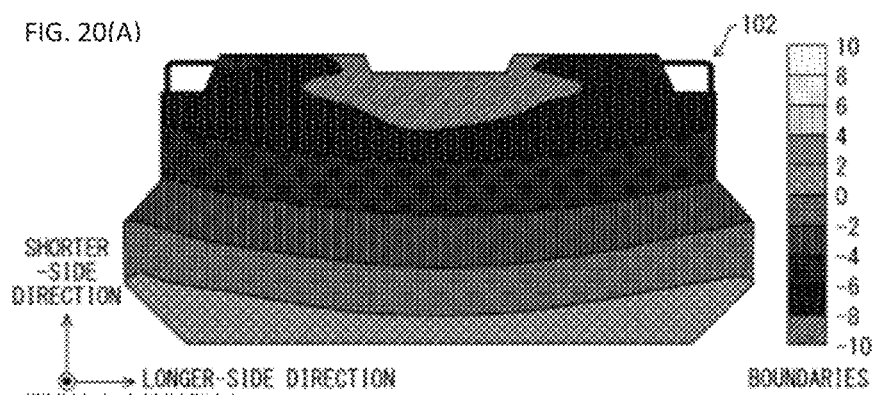
FIGS. 20(A)-(C) are plan views illustrating a distribution of an amount of deformation of an in-mold foamed molded product in the in-mold foamed molded product unit illustrated in FIG. 3.
Figure 20B:
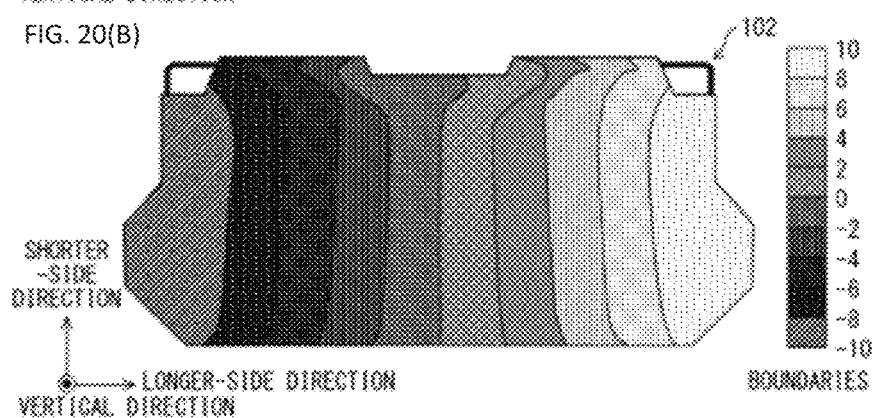
Figure 20C:
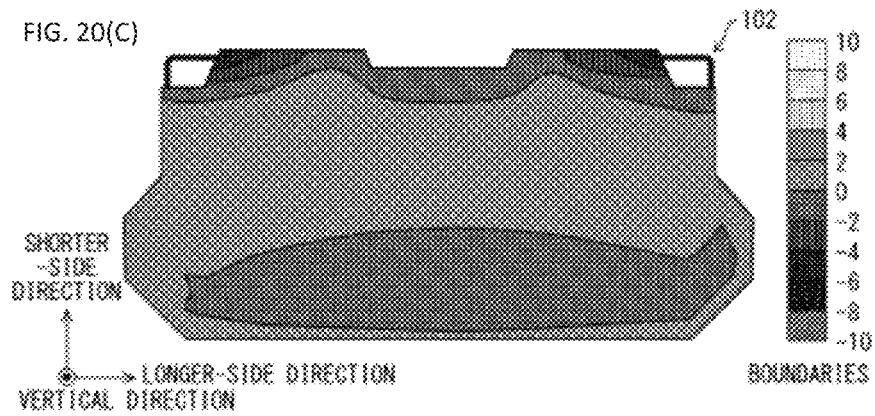

FIGS. 20(A)-(C) are plan views illustrating a distribution of an amount of deformation of an in-mold foamed molded product 1 of an in-mold foamed molded product unit 102 illustrated in FIG. 3. FIG. 20(A) shows the distribution of the amount of deformation in a shorter-side direction, FIG. 20(B) shows the distribution of the amount of deformation in a longer-side direction, and FIG. 20(C) shows the distribution of the amount of deformation in a vertical direction. In FIGS. 20(A)-(C), there is no region where an amount of deformation is not less than +2 mm and in FIGS. 20(A)-(C), respective regions of different amounts of deformation are regularly distributed. It is thus clear that the in-mold foamed molded product 1 of the in-mold foamed molded product unit 102 can be easily formed into a desired shape.

Figure 21:
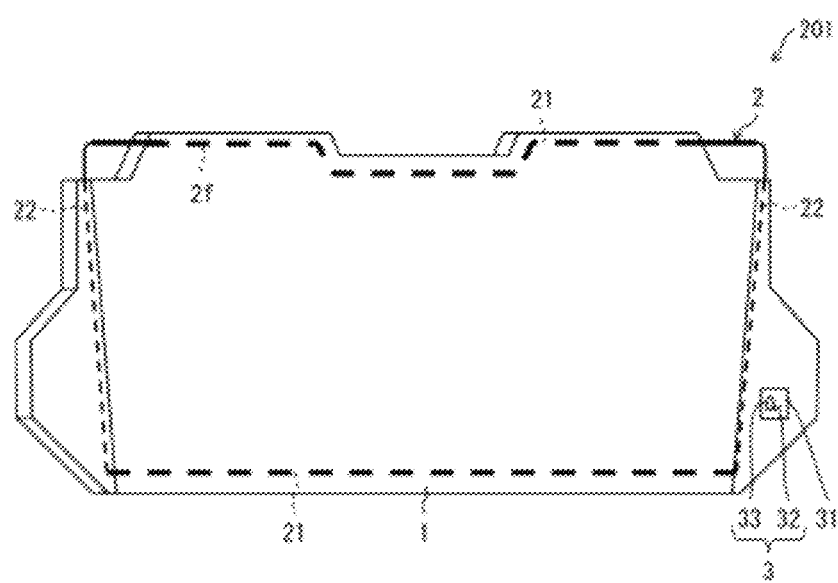
FIG. 21 is a perspective view schematically illustrating an in-mold foamed molded product unit in accordance with another comparative example of the present invention.

FIG. 21 is a perspective view schematically illustrating an in-mold foamed molded product unit 201 in accordance with another comparative example of the present invention. The in-mold foamed molded product unit 201 is different from the in-mold foamed molded product unit 102 as below.

The in-mold foamed molded product unit 201 is configured such that a second extending portion 22 is made of only the thin portion 2t. Further, the in-mold foamed molded product unit 201 not provided with any exposed portion 23. Note that though in FIG. 21, portions of the insert material 2 are exposed at upper left and upper right corners of the in-mold foamed molded product unit 201, these portions of the insert material 2 are merely portions which are difficult to insert in the in-mold foamed molded product 1, and these portions of the insert material 2 are different from the exposed portion 23 (these portions do not follow shrinkage and expansion of the in-mold foamed molded product 1).

Figure 22A:
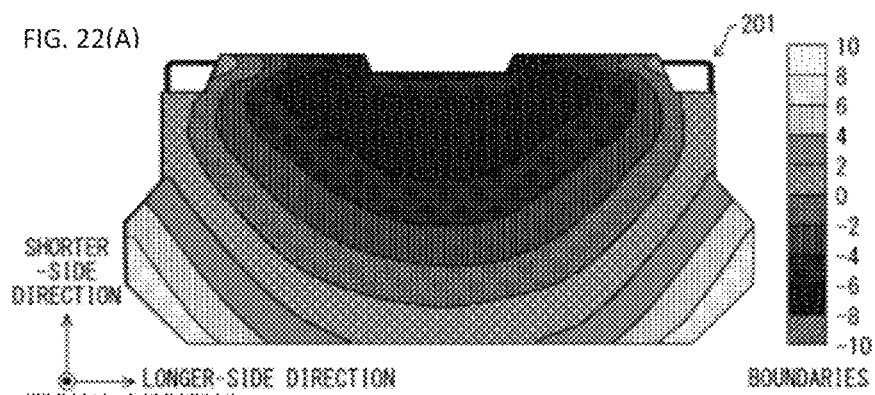
FIGS. 22(A)-(C) are plan views illustrating a distribution of an amount of deformation of an in-mold foamed molded product in the in-mold foamed molded product unit illustrated in FIG. 21.
Figure 22B:
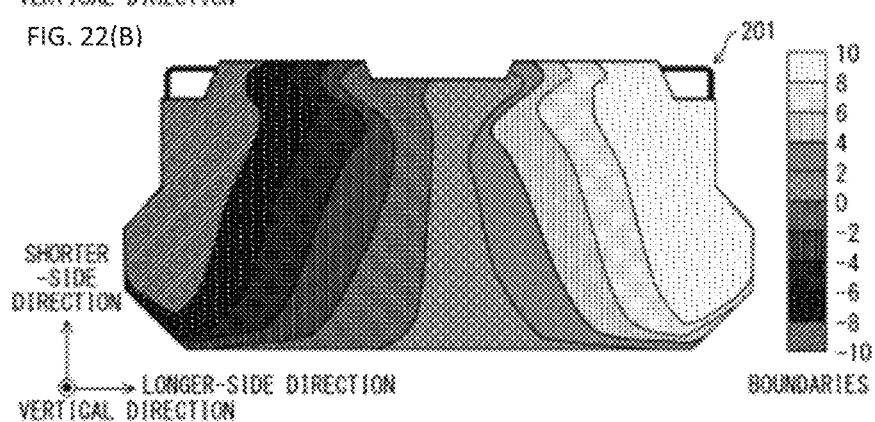
Figure 22C:
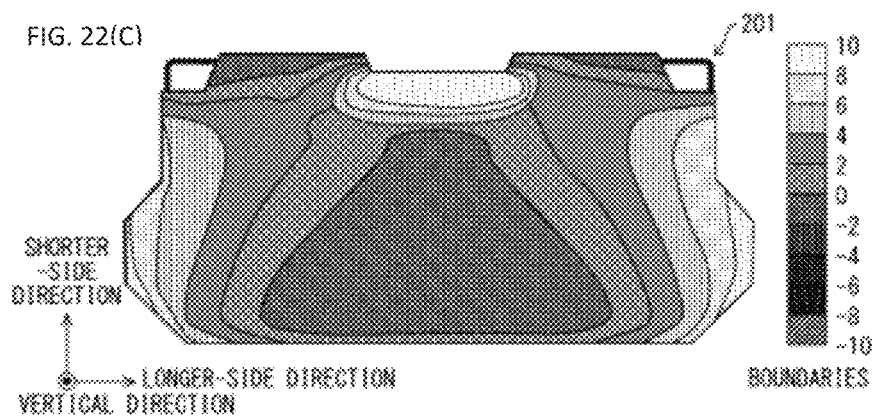

FIGS. 22(A)-(C) are plan views illustrating a distribution of an amount of deformation of the in-mold foamed molded product 1 in the in-mold foamed molded product unit 201 illustrated in FIG. 21. FIG. 22(A) shows the distribution of the amount of deformation in a shorter-side direction, FIG. 22(B) shows the distribution of the amount of deformation in a longer-side direction, and FIG. 22(C) shows the distribution of the amount of deformation in a vertical direction. In each of (FIGS. 22(A)-(C), there is a region where the amount of deformation is 10 mm at the maximum. Further, in FIGS. 22(A)-(C), respective regions of different amounts of deformation are not regularly distributed. It is thus clear that it is more difficult to form the in-mold foamed molded product 1 in the in-mold foamed molded product unit 201 into a desired shape as compared to that in the in-mold foamed molded product unit 102.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 in-mold foamed molded product
2 insert material
2f thick portion
2s imaginary rectangle
2t thin portion
3 retainer
21, 21' first extending portion
22, 22' second extending portion
23, 23' exposed portion
24a to 24c bent portion
100 to 114 in-mold foamed molded product unit

What is claimed is:

1. An in-mold foamed molded product unit, comprising:
an in-mold foamed molded product made of a thermoplastic resin; and
an insert material,
wherein:
at least a portion of the insert material is embedded in the in-mold foamed molded product,
the insert material has a frame shape comprising a first set of opposite sides and a second set of opposite sides,
a portion of the insert material that corresponds to the first set of opposite sides is a first extending portion, and a portion of the insert material that corresponds to the second set of opposite sides is a second extending portion,
each of the first extended portion and each of the second extended portion are straight or contain bent and/or curved portions,
the insert material includes four corners at ends of the first extending portion and ends of the second extending portion, the four corners represent four corners of an imaginary quadrangle,
the first extending portion and the second extending portion overlap with four sides of the imaginary quadrangle except for the bent and/or curved portions of the first extending portion and the second extending portion, the bent and/or curved portions of the first extending portion and the second extending portion are drawn apart from the four sides of the imaginary quadrangle, the first extending portion is entirely embedded in the in-mold foamed molded product except for a portion of the first extending portion, the second extending portion includes an exposed portion that is exposed to the outside of the in-mold foamed molded product, the exposed portion follows a shrinkage and expansion of the in-mold foamed molded product, the insert material is provided, at the exposed portion, on the in-mold foamed molded product, the exposed portion is provided along an edge of the in-mold foamed molded product, at least one side of the opposite sides corresponding to the second extending portion is wholly occupied by the exposed portion, and at least a portion of the exposed portion has a thickness that is thinner than a thickness of the first extending portion of the insert material.

2. The unit of claim 1, wherein the exposed portion includes not less than three bent portions, and wherein at each bent portion the insert material is bent.

3. The unit of claim 1, further comprising: a retainer which is entirely exposed to the outside of the in-mold foamed molded product.

4. The unit of claim 1, wherein:
one of the first set of opposite sides and the second set of opposite sides corresponds to a longer-side direction of the in-mold foamed molded product unit; and
the other set of opposite sides corresponds to a shorter-side direction of the in-mold foamed molded product unit.

5. The unit of claim 1, wherein the insert material is a frame having a rectangular shape.

6. An in-mold foamed molded product unit, comprising:
an in-mold foamed molded product made of a thermoplastic resin; and
an insert material,
wherein:
at least a portion of the insert material is embedded in the in-mold foamed molded product,
the insert material has a frame shape which is substantially rectangular and comprises comprising a first set of opposite sides and a second set of opposite sides,
a portion of the insert material that corresponds to the first set of opposite sides is a first extending portion, and a portion of the insert material that corresponds to the second set of opposite sides is a second extending portion,
each of the first extended portion and each of the second extended portion are straight or contain bent and/or curved portions,
the insert material includes four corners at ends of the first extending portion and ends of the second extending portion, the four corners represent four corners of an imaginary quadrangle,
the first extending portion and the second extending portion overlap with four sides of the imaginary quadrangle except for the bent and/or curved portions of the first extending portion and the second extending portion, the bent and/or curved portions of the first extending portion and the second extending portion are drawn apart from the four sides of the imaginary quadrangle, the first extending portion is entirely embedded in the in-mold foamed molded product except for a portion of the first extending portion, the second extending portion includes an exposed portion that is exposed to the outside of the in-mold foamed molded product, the exposed portion follows a shrinkage and expansion of the in-mold foamed molded product, and at least a portion of the exposed portion has a thickness that is thinner than a thickness of the first extending portion of the insert material.

7. A method for producing an in-mold foamed molded product unit, the method comprising:
molding an in-mold foamed molded product such that at least a portion of an insert material is embedded in the in-mold foamed molded product,
wherein:
the in-mold foamed molded product unit comprises:
an in-mold foamed molded product made of a thermoplastic resin; and
an insert material
the insert material has a frame shape comprising a first set of opposite sides and a second set of opposite sides,
a portion of the insert material that corresponds to the first set of opposite sides is a first extending portion, and a portion of the insert material that corresponds to the second set of opposite sides is a second extending portion,
each of the first extended portion and each of the second extended portion are straight or contain bent and/or curved portions,
the insert material includes four corners at ends of the first extending portion and ends of the second extending portion, the four corners represent four corners of an imaginary quadrangle,
the first extending portion and the second extending portion overlap with four sides of the imaginary quadrangle except for the bent and/or curved portions of the first extending portion and the second extending portion,
the bent and/or curved portions of the first extending portion and the second extending portion are drawn apart from the four sides of the imaginary quadrangle,
the molding of the in-mold foamed molded product provides the first extending portion being entirely embedded in the in-mold foamed molded product except for a portion of the first extending portion,
the molding of the in-mold foamed molded product provides the second extending portion with an exposed portion that is exposed to the outside of the in-mold foamed molded product,
the exposed portion follows a shrinkage and expansion of the in-mold foamed molded product, and
at least a portion of the exposed portion has a thickness that is thinner than a thickness of the first extending portion of the insert material.

8. The method of claim 7, wherein the insert material is a frame having a rectangular shape.

* * * * *